US010324357B2

United States Patent
Paliy

(10) Patent No.: US 10,324,357 B2
(45) Date of Patent: Jun. 18, 2019

(54) AUTOMATIC LENS APERTURE CONTROL FOR IMAGE AND VIDEO CAPTURE

(71) Applicant: INTEL CORPORATION, Santa Clara, CA (US)

(72) Inventor: Dmytro Paliy, Lempaala (FI)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 15/709,110

(22) Filed: Sep. 19, 2017

(65) Prior Publication Data

US 2019/0086766 A1    Mar. 21, 2019

(51) Int. Cl.
*H04N 5/238* (2006.01)
*H04N 5/235* (2006.01)
*G03B 7/095* (2006.01)
*H04N 5/232* (2006.01)

(52) U.S. Cl.
CPC ............ *G03B 7/095* (2013.01); *H04N 5/2351* (2013.01); *H04N 5/23216* (2013.01); *H04N 5/23229* (2013.01)

(58) Field of Classification Search
CPC ............... G03B 7/095; H04N 5/23216; H04N 5/23229; H04N 5/2351; H04N 1/02885; H04N 1/0429; H04N 1/19547; H04N 3/04; H04N 13/32
See application file for complete search history.

(56) References Cited

U.S. PATENT DOCUMENTS

2007/0024741 A1* 2/2007 Moriya ................ H04N 5/2352
348/363

OTHER PUBLICATIONS

Cvetkovic, S. et al., "Automatic Level Control for Video Cameras towards HDR Techniques", Research Article, EURASIP Journal on Image and Video Processing, vol. 2010, Article ID 197194, 30 pages, Hindawi Publishing Corporation, Cairo, Egypt.

* cited by examiner

*Primary Examiner* — Sinh Tran
*Assistant Examiner* — Selam T Gebriel
(74) *Attorney, Agent, or Firm* — Green, Howard & Mughal LLP.

(57) ABSTRACT

Techniques related to automatic aperture control for an imaging device are discussed. Such techniques may include implementing an aperture control value to adjust an aperture opening, measuring a rate of change in measured luminance at an image sensor in response to the aperture control value, and determining an aperture control hold value to hold the aperture opening at a current position using the aperture control value and the rate of change.

21 Claims, 12 Drawing Sheets

AUTOMATIC LENS APERTURE CONTROL FOR IMAGE AND VIDEO CAPTURE

BACKGROUND

In some imaging and video capture contexts such as video surveillance applications, auto iris control may be used. Auto iris control provides for variation of the optical lens aperture by determining whether the iris or aperture needs to be adjusted and sending a DC voltage signal to the aperture motor(s) to open or close the iris. Control of the iris provides for improved image and video capture. However, such systems are only stable in the fully open or fully closed condition and therefore the system overall is inherently unstable.

It may be advantageous to provide automatic lens aperture control for such systems that is stable such that high quality images and video may be attained. It is with respect to these and other considerations that the present improvements have been needed. Such improvements may become critical as the desire to remotely and automatically attain high quality images and video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
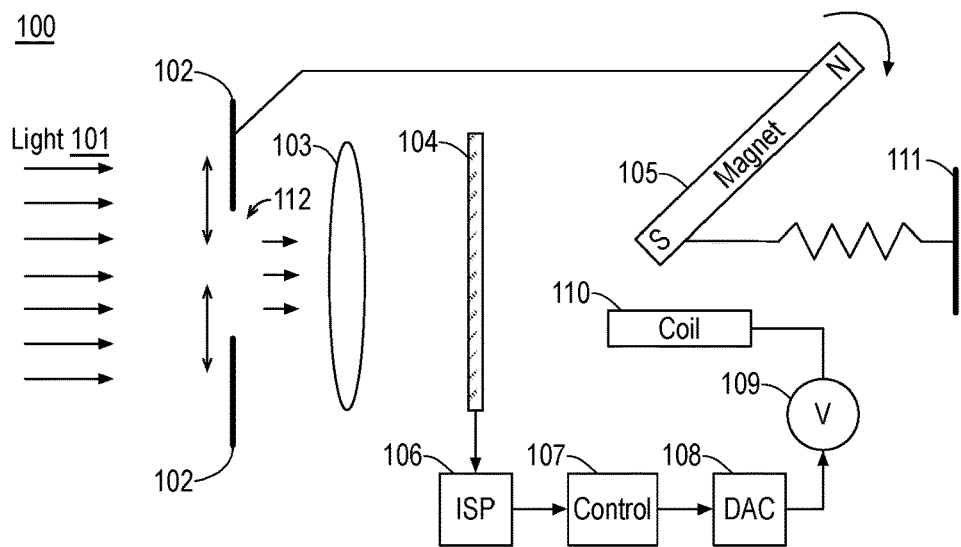
FIG. 1 illustrates an example system for providing auto iris control.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to auto iris control for an imaging device.

As described above, it may be advantageous to provide automatic lens aperture control in imaging systems for imaging and video capture contexts such as video surveillance applications. Techniques discussed herein provide for the determination of an aperture control hold value for an imaging system such that the aperture control hold value is to hold the aperture opening at a current position. Techniques discussed herein also include rejecting invalid measured rate of changes in measured luminance, determining confidence values corresponding to implemented aperture control values, and determining aperture control values to adjust from a measured frame luminance value and a target frame luminance value. Such techniques provide for improved or enhanced auto iris control or aperture control for imaging devices.

FIG. 1 illustrates an example system 100 for providing auto iris control, arranged in accordance with at least some implementations of the present disclosure. As shown in FIG. 1, system 100 may include aperture blades 102, a lens 103, an image sensor 104, a magnet 105, an image signal processor (ISP) 106, a controller (control) 107, a digital to analog converter (DAC) 108, a voltage supply (V) 109, a coil 110, and a spring. System 100 may be implemented via any suitable device such as a camera, a surveillance camera, or the like. Although discussed herein with respect to a remote camera device such as a surveillance camera, system 100 may be implemented in any imaging device such as a personal computer, a laptop computer, a tablet, a phablet, a smart phone, a digital camera, a gaming console, a wearable device, or the like.

In an embodiment, system 100 provides DC auto iris control via adjustment of aperture blades 102 such that the amount of light 101 received by image sensor 104 after passing through lens 103 is controlled. For example, DC auto-iris may provide for a controllable aperture as defined by an opening 112 between aperture blades 102. Such a controllable aperture is provided for optical lenses such as lens 103, which may be designed and/or selected for use in remote image capture devices such as security surveillance cameras or the like. As shown, system 100 provides a mechanical system for providing aperture control by moving aperture blades 102 that define opening 112 through which light is coming to a receiving imaging or image sensor 104. For example, the movement of aperture blades 102 may be provided by a mechanical system including coil 110, a permanent magnet such as magnet 105, and spring 111. For example, one or more of coil 110, magnet 105, spring 111, voltage supply 109, and digital to analog converter 108 may be implemented as a motor or the like such that controller 107 provides an aperture control value to digital to analog converter 108 for control of aperture blades 102 as discussed further herein. In an embodiment, the size of opening 112 is controlled by two (i.e., positive and negative) direct current (DC) analog lines such that an increasing or decreasing voltage is delivered to coil 110 by voltage supply 109 and digital to analog converter 108 under the control of controller 107. A change in voltage results in a speed of aperture blades 102 opening or closing, which is a controllable input parameter to system 100. For example, the digital value (e.g., controllable input parameter) as provided by controller 107 indicates how fast aperture blades can open or close. The controllable value (i.e., the aperture control value) is converted to electrical current using, for example, pulse-width modulation (PWM) by digital to analog converter 108.

The aperture control value as discussed herein may include any suitable value for control of aperture blades 102 as discussed herein. In an embodiment, the aperture control value is provided by controller 107 to digital to analog converter 108. In an embodiment, the aperture control value is or represents a duty cycle for pulse width modulation as implemented by digital to analog converter 108. For example, the aperture control value may provide or represent a percentage of how much available voltage from voltage supply 109 is provided to a motor to open aperture blades 102. For example, at implementation, the aperture control value may provide a percentage of voltage or power provided to coil 110 to open aperture blades 102. The aperture control value may then be changed over time to vary the power to open aperture blades 102. For example, a hold aperture control value may hold aperture blades 102 at their current position (the current position not being fully open or fully closed). An aperture control value less than the hold aperture control value is then expected to close aperture blades 102 and an aperture control value greater than the hold aperture control value is expected to open aperture blades 102. Furthermore, it may be advantageous to limit the maximum open and close speeds of aperture blades 102 such that the open and close are not too abrupt. As used herein, an aperture maximum open control value may be an aperture control value that sets a maximum open speed and an aperture maximum open control value may be an aperture control value that sets a maximum close speed for aperture blades 102. For example, the aperture maximum open and close control values may be within a relatively narrow band around the discussed hold aperture control value such that aperture blades 102 are not opened or closed too abruptly. The discussed aperture control value(s) may be characterized as aperture control parameter(s), control parameter(s), control value(s), control input value(s), control input parameter(s), or the like.

In an embodiment, system 100 may implement a high dynamic range (HDR) camera or image capture mode. For example, in HDR imaging, image sensor 104 of system 100 may be under significant constraints compared to conventional non-HDR imaging modes. For example, a low limit on digital exposure may lead to overexposed data or images even during typical bright days. In such contexts, to lower exposure and obtain more of useful information within the scene, system 100 may reduce exposure using controllable aperture blades 102 as discussed herein.

As discussed, in some embodiments, it is desirable to hold opening 112 between aperture blades 102 steady. However, the controllable value for holding opening 112 may vary based on implementation differences between implementations of system 100 including different DAC samples (i.e., the implemented digital to analog converter 108), different lens samples (i.e., the implemented lens 104), the time, temperature conditions, humidity conditions, and the like of image or video capture, etc. Embodiments discussed herein provide for increased control of system 100 via an imaging pipe feedback.

For example, iris or aperture control via aperture blades 102 may provide for a relatively open aperture for dark scenes (e.g., a scene viewed by system 100), a relatively closed aperture for bright scenes, and for maintaining the aperture steady when the brightness of the scene brightness meets a target level or is within a target window or the like.

Figure 2:
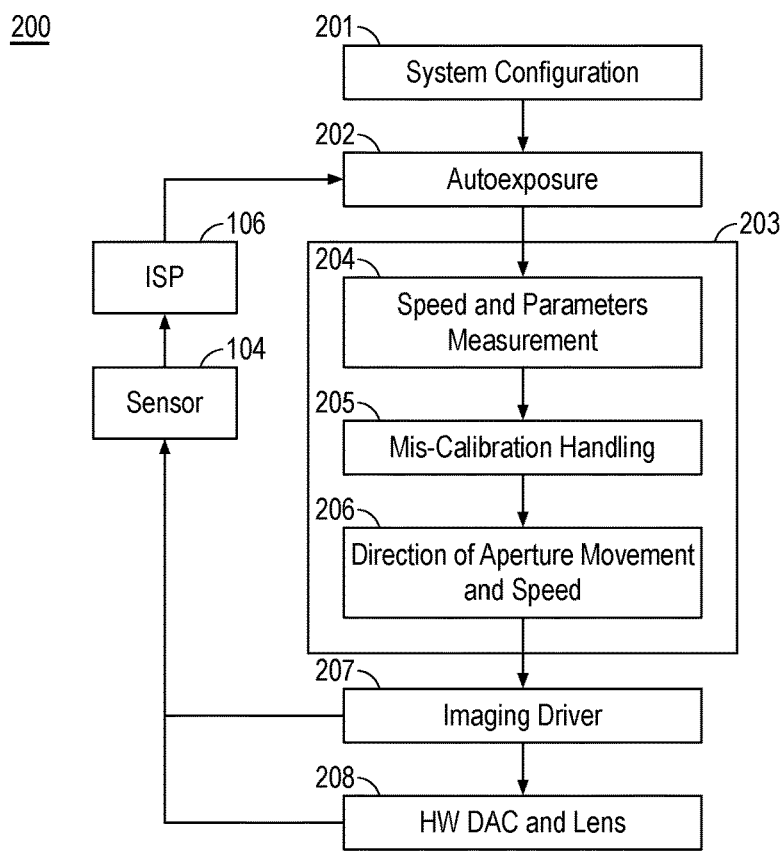
FIG. 2 illustrates an example architecture for providing auto iris control.

FIG. 2 illustrates an example architecture 200 for providing auto iris control, arranged in accordance with at least some implementations of the present disclosure. As shown in FIG. 2, architecture 200 may include a system configuration module 201, an autoexposure module 202, an aperture control value controller 203 including a speed and parameters measurement module 204, a mis-calibration handling module 205, and a direction of aperture movement and speed module 206, an imaging driver 207, a hardware digital to analog converter and lens 208, image sensor 104, and image signal processor 106. In an embodiment, digital to analog converter and lens 208 implements digital to analog converter 108 and lens 103. In an embodiment, architecture 200 is implemented by system 100. For example, system configuration module 201, autoexposure module 202, aperture control value controller 203, and imaging driver 207 may be implemented by controller 107.

In an embodiment, system configuration module 201 may provide configuration values for architecture 200 such as desired frame luminance, image or video capture parameters (e.g., resolution, frame rate, etc.) for implementation by a system such as system 100 utilizing architecture 200. Autoexposure module 202 may provide for autoexposure settings and the like for exposures implemented by a system such as system 100 utilizing architecture 200. Furthermore, as shown, autoexposure module 202 may receive post-processed image information from image signal processor 106. For example, a system such as system 100 utilizing architecture 200 may perform an exposure to attain an image or frame under control of autoexposure module 202 and after adjustment of an aperture opening and lens position as discussed further below. Image sensor 104 then provides image sensor data to image signal processor 106. Image signal processor 106 may process the image sensor data using any suitable technique or techniques such as demosaicing, downsampling, etc. and the image data may be provided to autoexposure module 202 and/or other modules of architecture 200. In particular, image signal processor 106, or another module of architecture 200, may generate a measured luminance value for an image or frame as captured by image sensor 104. The measured luminance value for the image or frame may be any suitable value representative of luminance or brightness of the image or frame such as an average luminance, a median luminance, or the like. In an embodiment, the measured luminance value for each frame is a mean luminance value from luminance values of a demosaiced and downsampled frame attained by image sensor 104. The measured luminance value for the image or frame may be characterized as a measured brightness, a representative luminance or brightness, or the like.

As shown, the measured luminance value may be provided to aperture control value controller 203 for processing as discussed herein. Furthermore, aperture control value controller 203 provides an aperture control value or a drive signal representative of the aperture control value to imaging driver 207 (or directly to a digital to analog converter) for implementation to open, close, or hold aperture blades 102 as discussed herein. After implementation of the aperture control value (and optional lens control, variation in exposure settings, etc.), a subsequent exposure of an image or video frame may be implemented to attain a subsequent image or video frame and processing may continue as discussed such that a series or sequence of aperture control values are provided to attain a series or sequence of image or video frames. The image or video frames have corresponding measured luminance values, which may be used as discussed herein to provide imaging control within architecture 200.

In an embodiment, the discussed aperture control may be based on aperture control values including an aperture control hold value, an aperture maximum close control value, and an aperture maximum open control value. As used herein, the aperture control hold value is an aperture control value that provides for (or attempts to provide for) the holding of an aperture opening at a current position (i.e., between fully open and fully closed), the aperture maximum close control value is an aperture control value that provides for (or attempts to provide for) the closing of the aperture at a maximum allowable speed (i.e., a predetermined maximum allowable speed), and the aperture maximum open control value is an aperture control value that provides for (or attempts to provide for) the opening of the aperture at a maximum allowable speed (i.e., a predetermined maximum allowable speed). As will be appreciated, any suitable aperture control values may be implemented. As shown in Table 1 below, the aperture control hold value may be characterized as Rh, the aperture maximum close control value may be characterized as Rc (to provide a corresponding a maximum allowable close speed of −Sc), and the aperture maximum open control value may be characterized as Ro (to provide a corresponding a maximum allowable open speed of +So).

TABLE 1

Commands and Register
Values to Control DC Auto Iris

| Aperture Control Value (HW Register Value) | Speed (Change in Luminance over Time) |
|---|---|
| Open (Ro) | +So |
| Hold (Rh) | 0 |
| Close (Rc) | −Sc |

For example, architecture 200, via aperture control value controller 203, may measure scene brightness change speed (i.e., change in measured luminance across frames and over time), handles mis-calibration in situations where underlying assumptions regarding scene stability do not hold, and determines aperture or iris opening speed and direction based on image sensor data and target signal level for the next frame. The resultant aperture control values may be stored (as illustrated with respect to Table 1) and/or sent to a digital to analog converter for control of lens blades as discussed herein. For example, it may be an object of aperture control value controller 203 to determine the aperture control hold value, Rh, the aperture maximum close control value, Rc, and the aperture maximum open control value, Ro, as well as an of aperture control value for implementation (such that the aperture control value, R∈[Rc, Ro]).

As discussed, the implementation of system 100 and/or architecture 200 may include variations in DAC samples, lens samples, time, temperature conditions, humidity conditions, etc. that may provide for a need for calibration of aperture control parameters as discussed herein. Furthermore, the response of aperture control to aperture control values (i.e., expected opening, closing, holding) may be non-linear. For example, for different DAC samples, register values for the same speed values, may significantly vary as shown in Table 2).

TABLE 1

Commands and Register
Values to Control DC Auto Iris

| DAC 1 | | DAC 2 | |
|---|---|---|---|
| Registers | Speed | Registers | Speed |
| Ro = 350 | +50 | Ro = 450 | +50 |
| Rh = 250 | 0 | Rh = 350 | 0 |
| Rc = 220 | −20 | Rc = 320 | −20 |

Figure 3:
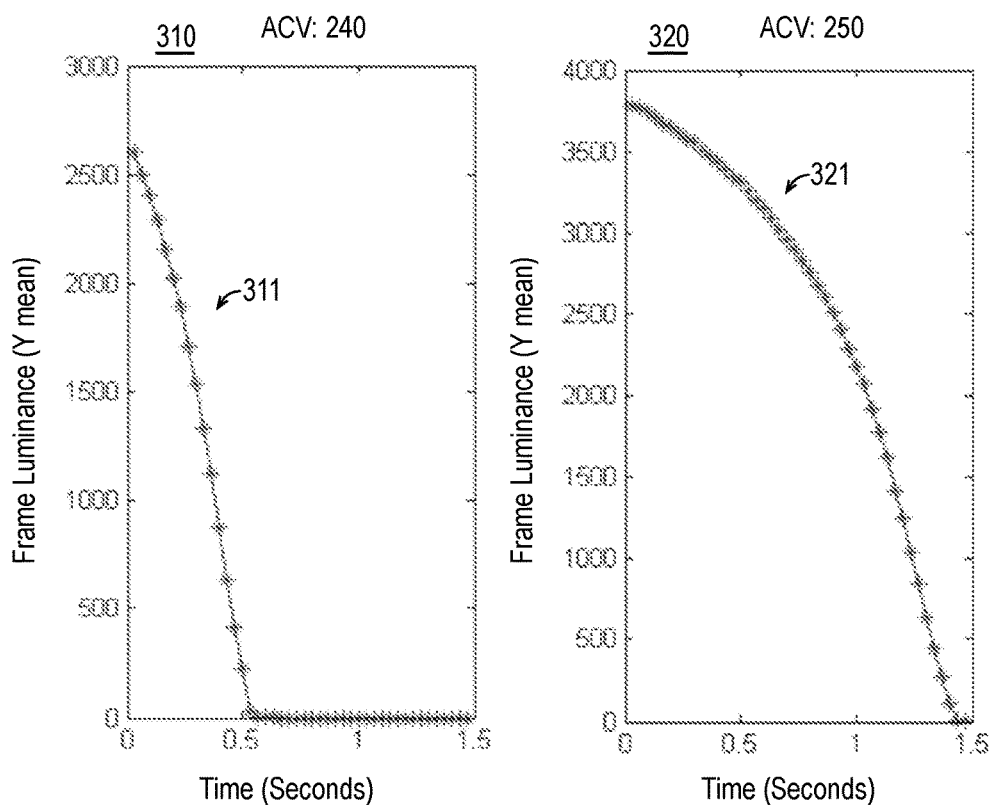
FIG. 3 illustrates example aperture close responses at different aperture control values.

FIG. 3 illustrates example aperture close responses at different aperture control values, arranged in accordance with at least some implementations of the present disclosure. As shown in FIG. 3 via charts 310, 320, which provide frame luminance (Y mean) versus time (in seconds), in one implementation (see chart 310), at an aperture control value of 240, a frame luminance may decrease over time as shown with respect to curve 311 and, in an implementation (see chart 320), at an aperture control value of 250, a frame luminance may decrease over time as shown with respect to curve 321. As shown, curves 311, 321 are non-linear with curve 311 approximating linearity more closely than curve 321. Curves 311, 321 illustrate that aperture control may have varying speed based on aperture control value as well as varying response over time.

Figure 4:
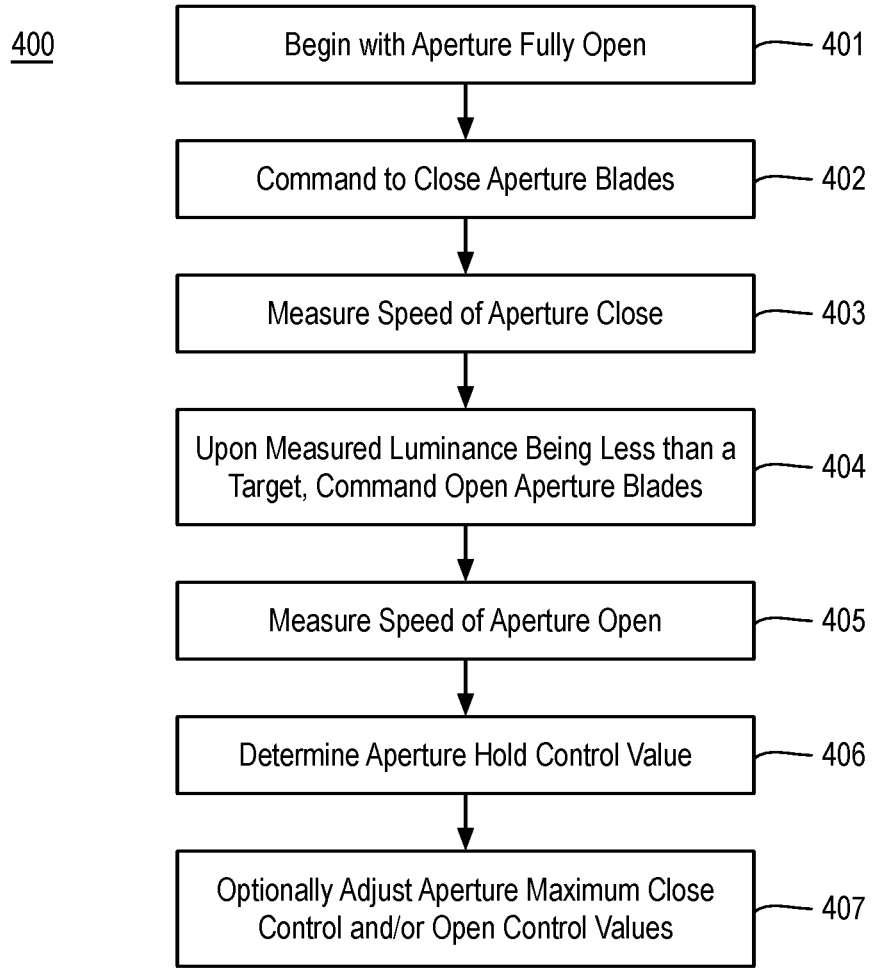
FIG. 4 illustrates an example process for providing auto aperture or iris control for an imaging device.

FIG. 4 illustrates an example process 400 for providing auto aperture or iris control for an imaging device, arranged in accordance with at least some implementations of the present disclosure. Process 400 may include one or more operations 401-407 as illustrated in FIG. 4. Process 400 may be performed by an imaging device (e.g., system 100 or any other system or device discussed herein) to provide enhanced auto aperture or iris control. For example, process 400 may provide for calibration via the search for or determination of an optimal or near-optimal aperture hold parameter (i.e., aperture control hold value). Process 400 is implemented at the beginning of a run-time of the imaging device, for example, and may require no actions from a user. In addition or in the alternative, or process 400 may be used continuously while the imaging device is capturing a video stream.

Process 400 may begin at operation 401, where an aperture may be set to fully open. In an embodiment, an aperture control value may be provided as an aperture maximum open control value to drive aperture blades 102 to a fully open position. Processing may continue at operation 402, where a command may be provided to close the aperture (or iris) via an aperture control value to close aperture blades as discussed. The aperture control value used to command the close may be any suitable value such as an aperture maximum close control value (i.e., a value corresponding to a maximum close speed) or any value between a previously determined (or preset) aperture control hold value and the aperture maximum close control value. In an embodiment, the close request at operation 402 may be in response to an indication (e.g., via a measured luminance) that a scene being viewed by the imaging device is too bright. That is, the imaging device may maintain at a current aperture position until the scene dictates a change is needed. Such calibration as needed techniques may provide the advantage that the imaging device is always available.

Although discussed with respect to beginning at a fully open position at operation 401 and closing aperture blades 102 at operation 402, operation 401 may begin with aperture blades 102 at any suitable position such as fully closed (and opening aperture blades 102 at operation 402), or a partially opened or closed position (and opening or closing aperture blades 102). In any case, a change in the position of aperture blades 102 may be provided via the implementation of the aperture control value.

Processing may continue at operation 403, where, upon implementation of the aperture close command provided at operation 402, the speed of aperture close is measured as a rate of change in measured luminance of images or video frames captured by an image sensor of the imaging device over time. The speed of aperture close based on a rate of change in measured luminance of images or video frames may be determined using any suitable technique or techniques. For example, the speed may be a rate of change in measured luminance over time as discussed herein.

In an embodiment, the rate of change in measured luminance over time is a difference between the measured luminance of a current frame minus the measured luminance of a previous frame divided by the change in time between the current and previous frames. In an embodiment, the speed of aperture close may be measured as shown in Equations (1) and (2) as follows:

$$S_{New}(R) = \text{MAX}\left\{S_{Old}(R), \frac{f_o(t_N) - f_o(t_{N-1})}{\Delta t}\right\}, \quad (1)$$
$$\text{if } f_o(t_N) - f_o(t_{N-1}) > 0 \text{ and } R > Rh,$$

$$S_{New}(R) = \text{MIN}\left\{S_{Old}(R), \frac{f_o(t_N) - f_o(t_{N-1})}{\Delta t}\right\}, \quad (2)$$
$$\text{if } f_o(t_N) - f_o(t_{N-1}) < 0 \text{ and } R < Rh,$$

where $\Delta t$ is a measure of time (i.e., 40 microseconds for 25 fps cameras, 33 microseconds for 30 fps cameras, frame count, or measured from real time stamps of incoming frames), and $f_o(t_N) - f_o(t_{N-1})$ is a difference in measured image or frame luminance such as a luminance or brightness signal mean (i.e., o stands for output) between two subsequent frames, $S_{New}$ is a measured speed for the issued aperture control value (e.g., aperture command), R. In an embodiment, for any aperture control value (e.g., aperture command) implemented by the imaging system, the change in measured luminance or the maximum open or close speed is measured in terms of change in measured luminance or speed of mean change in the luminance signal. For example, the rate of change in measured luminance at the implemented aperture control value may be a maximum (for open commands) or minimum (for close commands, which corresponds to a maximum close speed)) rate change in measured luminance between any two time instances across the duration of the implementation of the aperture control value.

Processing may continue at operation 404, where, upon the measured luminance being less than a target luminance, a command may be provided to open the aperture (or iris) via an aperture control value to open aperture blades. The aperture control value used to command the open may be any suitable value such as an aperture maximum open control value (i.e., a value corresponding to a maximum open speed) or any value between a previously determined (or preset) aperture control hold value and the aperture maximum open control value. In an embodiment, the open request at operation 404 may be in response to an indication (e.g., via a measured luminance) that the measured luminance is less than a target luminance. The target luminance may be any suitable value such as a preset target luminance or the like. For example, the open command may be responsive to an indication the scene being viewed by the imaging device is too dark. That is, the imaging device may maintain the close aperture command until the scene dictates a change is needed. In other embodiments, the open request at operation 404 may be implemented prior to the measured luminance being less than a target luminance or upon reaching a fully closed iris position, or any other suitable position.

Processing may continue at operation 405, where, upon implementation of the aperture open command provided at operation 404, the speed of aperture open is measured as a rate of change in measured luminance of images or video frames captured by an image sensor of the imaging device over time. The speed of aperture open based on a rate of change in measured luminance of images or video frames may be determined using any suitable technique or techniques. For example, the speed may be a change in measured luminance over time as discussed herein. In an embodiment, the rate of change in measured luminance over time is a difference between the measured luminance of a current frame minus the measured luminance of a previous frame divided by the change in time between the current and previous frames. In an embodiment, the speed of aperture open may be measured as discussed with respect to Equations (1) and (2) above.

Processing may continue at operation 406, where the aperture hold control value may be determined based on the aperture control close value issued at operation 402, the speed of aperture close measured at operation 403, the aperture control open value issued at operation 404, and the speed of aperture open measured at operation 405. For example, the aperture hold control value may be determined by an interpolation to determine an aperture control value that would correspond to a rate of change in luminance over time (e.g., speed) of zero based on the aperture control close value issued at operation 402, the speed of aperture close measured at operation 403, the aperture control open value issued at operation 404, and the speed of aperture open measured at operation 405. In an embodiment, a linear interpolation for the aperture control value that would correspond to a rate of change in luminance over time (e.g., speed) of zero of aperture of zero (or closest available to zero) based on the above known points is used to determine the aperture hold control value. For example, if the aperture control close value is 220, the speed of aperture close is −20, the aperture control open value is 350, and the speed of aperture open measured at operation +30, the aperture hold control value would be 272 ((350−220)/(+30−(−20))*20+ 220) using linear interpolation. However, non-linear interpolations may also be used. As discussed, the aperture control close value may be the aperture control maximum close value or any other aperture control close value. Similarly, the aperture control open value may be the aperture control maximum open value or any other aperture control open value.

As discussed, measured rate of change (speed) in luminance over time upon implementation of aperture control close and open values may be used to determine an optimal or near-optimal aperture hold control value. In an embodiment, for improved performance, system delay caused by an image sensor, image signal processor, software stack, and the like may be measured to determine the proper measured speed of luminance over time. For example, the correct $S_{New}(R)$ as a response of $f_o(t_N-D)$ such that D is the time delay. Such a delay is omitted, without loss of generality, in further explanations for the sake of clarity of presentation.

As discussed, in process 400, when both responses (i.e., rate of change (speed) in luminance over time or luminance change over time or the like) to a close command such that R<Rh or R≤Rh and an open command such that R>Rh or R≥Rh are measured, the aperture control hold value, Rh, is set to the aperture control hold value that corresponds most closely with an interpolated rate of change (speed) in luminance over time of zero.

Processing may continue at operation 407, where one or both of the aperture maximum open control value, Ro, and the aperture maximum close control value, Rc, may be adjusted or determined. For example, when an aperture maximum close control value was implemented at operation 402, the measured rate of change (speed) in luminance measured at operation 403 may be used to adjust the aperture maximum close control value. In an embodiment, when the measured rate of change (speed) in luminance change is too fast (i.e., too large of a negative number with respect to a preset threshold; that is, less than the preset threshold), the aperture maximum close control value, Rc, may be increased (i.e., to provide slower closing). In an embodiment, when the measured rate of change (speed) in luminance change is too slow (i.e., too small of a negative number with respect to the preset threshold; that is, greater than the preset threshold), the aperture maximum close control value, Rc, may be decreased (i.e., to provide faster closing). As discussed, the measured rate of change (speed) in luminance change may be compared to a preset threshold or the like, which may be any suitable value reflective of a desired aperture close speed.

Similarly, when an aperture maximum open control value was implemented at operation 404, the measured rate of change (speed) in luminance change measured at operation 405 may be used to adjust the aperture maximum open control value. In an embodiment, when the measured rate of change (speed) in luminance change is too fast (i.e., greater than a preset threshold), the aperture maximum open control value, Ro, may be decreased (i.e., to provide slower opening). In an embodiment, when the measured rate of change (speed) in luminance change is too slow (i.e., less than the preset threshold), the aperture maximum open control value, Ro, may be increased (i.e., to provide faster opening). As discussed, the measured rate of change (speed) in luminance change may be compared to a preset threshold or the like, which may be any suitable value reflective of a desired aperture open speed.

In embodiments where a value other than the aperture maximum close control value or the aperture maximum open control value are implemented at operations 402, 404, the aperture maximum close control value and/or aperture maximum open control value may be updated using extrapolation technique. In an embodiment, when an aperture close control value between the aperture maximum close control value and the aperture control hold value (i.e., Rc<R<Rh) was implemented at operation 402, the measured speed of luminance change measured at operation 403 may be used to adjust the aperture maximum close control value by extrapolating the aperture maximum close control value that corresponds most closely with the preset aperture close speed (i.e., −Sc). For example, linear extrapolation techniques may be used. Similarly, when an aperture open control value between the aperture maximum open control value and the aperture control hold value (i.e., Rh<R<Ro) was implemented at operation 402, the measured speed of luminance change measured at operation 405 may be used to adjust the aperture maximum open control value by extrapolating the aperture maximum close control value that corresponds most closely with the preset aperture open speed (i.e., +So). For example, linear extrapolation techniques may be used.

As discussed, process 400 may provide for real time calibration of an aperture control hold value, Rh, as well as an aperture maximum close control value, Rc, and an aperture maximum open control value, Ro. For example, as used herein the aperture maximum close control value, Rc, and the aperture maximum open control value, Ro, are operational maximum close control and open control values such that they provide a subset of the maximum open and maximum close capabilities of the hardware. That is, the "maximum" open and close control values are less than those provided by hardware. Such maximum open and close control values may be characterized as operational maximum close control values, operational maximum open control values, or the like. In some embodiments, such calibration may rely on the assumption that the underlying scene (e.g., as viewed by the image device being calibrated) is relatively static in terms of frame luminance (e.g., not necessarily static in terms of objects being static). However, in real-time field implementations, the underlying scene may not be static.

Figure 5:
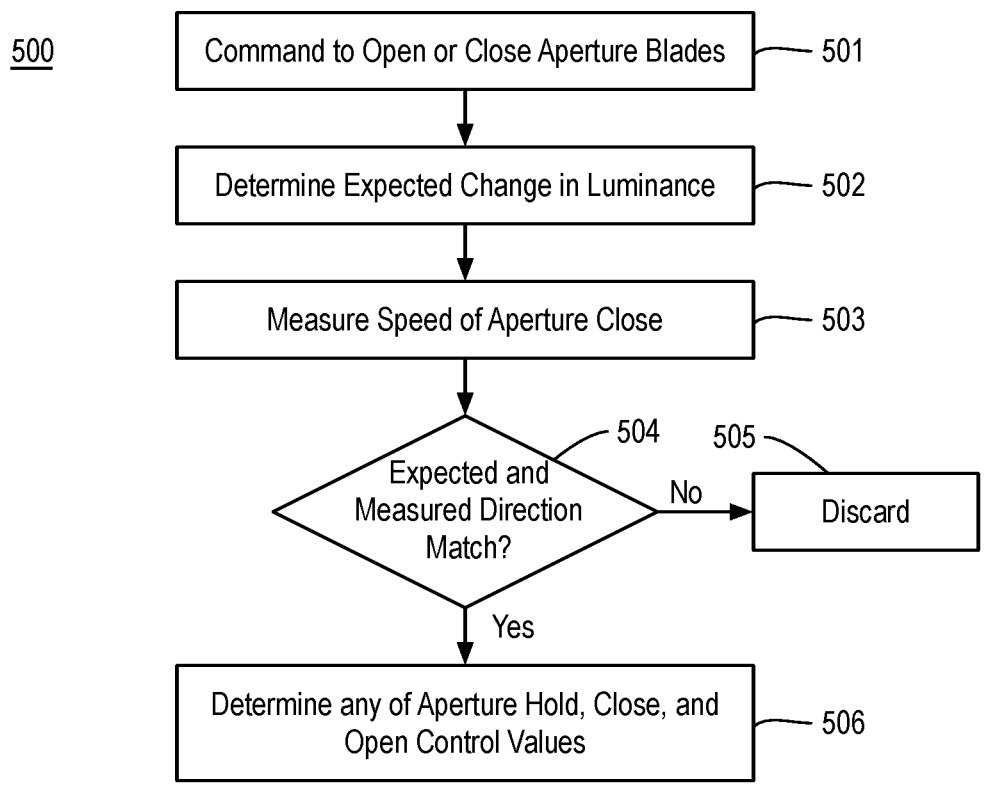
FIG. 5 illustrates an example process for providing auto aperture or iris control for an imaging device.

FIG. 5 illustrates an example process 500 for providing auto aperture or iris control for an imaging device, arranged in accordance with at least some implementations of the present disclosure. Process 500 may include one or more operations 501-506 as illustrated in FIG. 5. Process 500 may be performed by an imaging device (e.g., system 100 or any other system or device discussed herein) to provide enhanced auto aperture or iris control.

Process 500 may begin at operation 501, where a command may be provided to open or close or hold an aperture (or iris) via an aperture control value to open or close aperture blades as discussed herein. The aperture control value used to command the close or open or hold may be any suitable value. For example, to close the aperture, an aperture maximum close control value (i.e., a value corresponding to a maximum close speed) or any value between a previously determined aperture control hold value and the aperture maximum close control value may be used. Similarly, to open the aperture, an aperture maximum open control value (i.e., a value corresponding to a maximum open speed) or any value between a previously determined aperture control hold value and the aperture maximum open control value may be used. To hold the aperture, the aperture control hold value may be used. In some embodiments, operation 501 may correspond to one of operations 402, 404.

Processing may continue at operation 502, where an expected change in luminance is determined. In an embodiment, the expected change in luminance may be a direction of change in the luminance. For example, an open command provides for an expectation of an increase in luminance, a close command provides for an expectation of a decrease in luminance, and a hold command provides for an expectation of no change in luminance. In some embodiments, the expected change in luminance may include a direction and magnitude of a rate of change in the luminance. For example, when an open command issues an aperture maximum open control value, the expectation is an increase in luminance of about +So. Similarly, when a close command issues an aperture maximum close control value, the expectation is a decrease in luminance of about −Sc. For other open or close aperture control values, previously measured luminance change speeds or interpolated luminance change speeds (i.e., based on Rc, Rh, −Sc, zero and the implemented aperture control close value or based on Rh, Ro, zero, +Sc and the implemented aperture control open value) may be used as expected change speeds.

Processing may continue at operation 503, where, upon implementation of the aperture open or close command provided at operation 501, the speed of aperture open or close is measured as a rate of change (speed) in measured luminance of images or video frames captured by an image sensor of the imaging device over time as discussed herein. The speed of aperture open or closed based on a change in measured luminance of images or video frames may be determined using any suitable technique or techniques. For example, the speed may be a change in measured luminance over time as used herein. In an embodiment, the change in measured luminance over time is a difference between the measured luminance of a current frame minus the measured luminance of a previous frame divided by the change in time between the current and previous frames. In an embodiment, operation 502 may correspond to one of operations 403, 405.

Processing may continue at operation 504, where a determination may be made as to whether the expected change in luminance and the measured change in luminance match. The determination as to whether the expected change in luminance and the measured change in luminance match may be made using any suitable technique or techniques. In an embodiment, only the direction of expected change may be compared (i.e., a match is found when the luminance increases or decreases or does not change according to expectation). In an embodiment, a difference between the expected change in luminance and the measured change in luminance must be within a predetermined threshold (e.g., a difference of no more than 5, no more than 10, or the like) to find a match. As shown, when a match is found, process 500 continues at operation 506 where one or more of the aperture control hold value, Rh, the aperture maximum close control value, Rc, and the aperture maximum open control value, Ro, may be determined using any suitable technique or techniques such as those discussed with respect to operations 406, 407. If no match is found, process 500 continues at operation 505, where the measurement may be discarded. In some embodiments, process 500 may continue from operation 505 at operation 501, where continued processing may be used to determine the aperture control hold value, Rh, the aperture maximum close control value, Rc, and the aperture maximum open control value, Ro as discussed herein.

Figure 6:
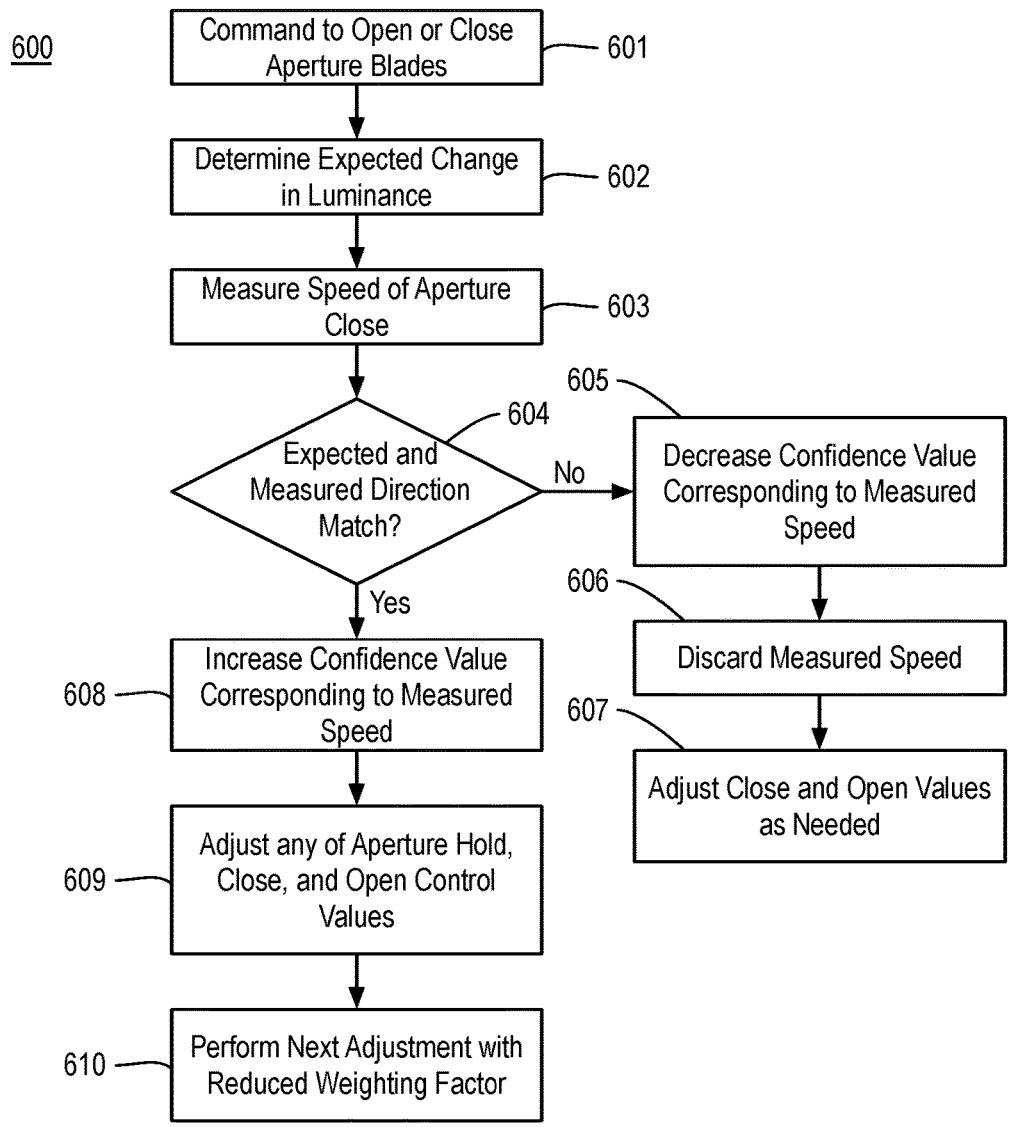
FIG. 6 illustrates an example process for providing auto aperture or iris control for an imaging device.

FIG. 6 illustrates an example process 600 for providing auto aperture or iris control for an imaging device, arranged in accordance with at least some implementations of the present disclosure. Process 600 may include one or more operations 601-609 as illustrated in FIG. 6. Process 600 may be performed by an imaging device (e.g., system 100 or any other system or device discussed herein) to provide enhanced auto aperture or iris control.

Process 600 may begin at operations 601-604, where a command may be provided at operation 601 to open or close or hold an aperture (or iris) via an aperture control value to open or close aperture blades as discussed with respect to operation 501, where an expected change in luminance is determined at operation 602 based on the implemented aperture control value as discussed with respect to operation 502, where, upon implementation of the aperture open or close command provided at operation 601, the speed of aperture open or close is measured as a change in measured luminance of images or video frames captured by an image sensor of the imaging device over time as discussed with respect to operation 603, and where a determination may be made at operation 604 as to whether the expected change in luminance and the measured change in luminance match as discussed with respect to operation 504. In an embodiment, for a close command (e.g., Rc), the expectation at operation 604 is that the speed is between 0 and the current max close speed (−Sc) and that at each frame iteration (e.g., application of operation 601 on a frame by frame basis) the close speed is increasing (for close commands). Similarly, in an embodiment, for an open command (e.g., Ro), the expectation at operation 604 is that the speed is between 0 and the current max open speed (+So) and that at each frame iteration (e.g., application of operation 601 on a frame by frame basis) the open speed is increasing (for open commands). For example, with reference to FIG. 3, it can be seen that an expectation of the aperture open or close is that the speed increases over time.

As shown, if a match is not found at decision operation 604, process 600 continues at operation 605 where a confidence value corresponding to the aperture control value issued at operation 601 may be decreased. For example, some or all available aperture control values may each have a confidence value corresponding thereto that provides a measure of confidence as to the confidence of the speed of aperture open or close corresponding thereto. In an embodiment, each of the aperture control hold value, Rh, the aperture maximum close control value, Rc, and the aperture maximum open control value, Ro, have confidence levels (Ch, Cc, Co) corresponding thereto. The confidence levels may be any suitable values such as values in the range of 0 to 100 or the like. As discussed further herein, for a low confidence level (e.g., 0 or within a threshold of 0), the measured value (e.g., speed) may be overwritten when a valid speed is attained. For a high confidence level (e.g., greater than a threshold), the measured value (e.g., speed) for any of Rh, Ro, Rc may be used to update the measured value corresponding thereto but with a lower weighting (e.g., via weighted averaging with a lower weight applied to the current measured value) or it may be kept unless the confidence in the current value has decreased suffciently.

As discussed, a confidence value corresponding to the aperture control value issued at operation 601 may be decreased when no match is found at operation 604. The confidence value may be decreased using any suitable technique or techniques. In an embodiment, the confidence value is decreased in proportion to the difference between the measured and expected changes discussed above. In an embodiment, the confidence value is decreased to zero. As shown, processing may continue from operation 605 at operation 606 where the measured rate of change (speed) in luminance may be discarded. Furthermore, processing may continue at operation 607 where the aperture maximum open control value or the aperture maximum close control value may be adjusted as needed. For example, when an open command is issued at operation 601 with a current aperture maximum open control value and the aperture does not open (e.g., a positive change in luminance does not occur) and/or the speed of open does not increase for a predetermined amount of time such as, for example, half a second, one second, two seconds, or the like, the aperture maximum open control value may be increased gradually (e.g., about 1% per millisecond or 1 aperture control value unit per frame or the like) until movement occurs and meaningful measurements may be made as discussed herein. Similarly, when a close command is issued at operation 601 with a current aperture maximum close control value and the aperture does not close (e.g., a negative change in luminance does not occur) and/or the speed of open does not increase for a predetermined amount of time such as, for example, half a second, one second, two seconds, or the like, the aperture maximum close control value may be decreased gradually (or increased in the negative direction) (e.g., about 1% per millisecond or 1 aperture control value unit per frame or the like) until movement occurs and meaningful measurements may be made as discussed herein.

If a match is found at decision operation 604, process 600 continues at operation 608 where a confidence value corresponding to the aperture control value issued at operation 601 may be increased. For example, if issuance of a command of Rc is issued at operation and the measured speed is speed from 0 to −Sc (e.g., max close speed) and increasing (e.g., from a previous frame measurement), the confidence value corresponding to command Rc is increased. Similarly, if issuance of a command of Ro is issued at operation and the measured speed is speed from 0 to +So (e.g., max open speed) and increasing (e.g., from a previous frame measurement), the confidence value corresponding to command Ro is increased. Furthermore, the Rc or Ro values may be changed as needed and the new −Sc or +Sc may be stored. The confidence value may be increased using any suitable technique or techniques. In an embodiment, the confidence value is increased inversely to the difference between the measured and expected changes discussed above. In an embodiment, the confidence value is incremented by a predetermined amount such as 1 or the like. In an embodiment, the confidence value may have a maximum limit such that the confidence value cannot increase indefinitely, which would make changes impossible over time. As shown, processing may continue from operation 608 at operation 609 where any of the discussed aperture control hold value, the aperture maximum close control value, and the aperture maximum open control value may be adjusted as discussed herein.

Furthermore, processing may continue at operation 610 from operation 609, where, for any subsequent adjustments of the aperture control hold value, the aperture maximum close control value, and the aperture maximum open control value may be made with a reduced weighting factor when the confidence level was increased at operation 609. For example, in the context of a high confidence in a current aperture control value, subsequent adjustments may be made with a lower weighting such that the high confidence value is maintained and such that changes are smoothed out over time. Similarly, in the context of a low confidence in a current aperture control value, subsequent adjustments may made with a higher weighting or used in their entirety such that the low confidence value is replaced or discarded. For example, the confidence value corresponding to a measured parameter may range from zero (low confidence) to any higher value. A low confidence value (e.g., zero or within a threshold of zero) implies that there is no useful information in the current measurement (e.g., it does not align with expectations as discussed) and the measurement may be immediately overwritten in a next iteration. A high confidence value indicates the current measurement value may overwrite a previous value of parameter Rx and its measurement Sx that previously had a lower weight.

In an embodiment, upon a repeated implementation of the aperture control value issued at operation 601, the rate of change (speed) in luminance is again measured using any techniques discussed herein. When the measured rate of change (speed) in luminance is able to provide an updated valid measurement (as discussed with respect to decision operation 604), the newly measured rate of change (speed) in luminance along with the previously measured rate of change (speed) in luminance (i.e., providing high confidence as discussed above) may be used to adjust one or more of the aperture control hold value, the aperture maximum close control value, or the aperture maximum open control value as discussed herein. For example, in such calculations the rate of change (speed) in luminance corresponding to the aperture control value issued at operation 601 and again as discussed herein may be a weighted average of the first measured rate of change (speed) in luminance and the second rate of change (speed) in luminance such that the first is weighted more heavily than the second to make alterations more difficult due to the high level of confidence.

As discussed with respect to operation 607, when an aperture is not opening or closing upon repetitive requests to open or close, the aperture maximum open control value may be increased or the aperture maximum close control value may be decreased.

Process 600 illustrates example calibration and auto aperture or iris control techniques. For example, confidence in measured parameters may measure or indicate whether a response in a next frame corresponds to current available measurements and/or expectations such that, when a command close Rc is issued, the expectation is that in next frame (a) the aperture will be closing at a speed not faster than speed Sc (e.g., a measured Sc or initialized Sc) and (b) that the closing speed is increasing. As discussed herein, the system attempts to measure the max possible speed (Sc) for Rc. For a next frame, if the speed of closing (Sc) meets both (a) and (b), the confidence level, Cc, in the estimation of this parameter Rc is increased, Rc is changed if needed, and a new Sc is stored (taking into account previous Cc). As discussed, Rc may be adjusted using any suitable technique or techniques such as incrementing it by one or weighted averaging. Furthermore, if speeds corresponding to Rc were previously measured and all of them were accurate (e.g., the confidence value is high), Rc may adjusted less significantly. Alternatively, if Cc was 0 or some low value, Rc and/or Sc may be adjusted with new measurements more easily (e.g., with a higher weighting or by replacement of the values). As discussed elsewhere herein, it is possible that the scene itself has changed and brightness of the scene increased. In such instances, it is not known whether parameter Rc is incorrect (e.g., it opened the iris instead of closing) or whether parameter Rc is correct but the scene has changed. In such instances (e.g., where (a) and/or (b) are not met), the confidence value Cc is decreased and the parameters Rc and Sc are not changed (e.g., they are discarded). Similarly, it is possible that, when issuing command Rc to close iris, the iris is not closing because Rc is incorrect. For example Rc may not yet have been calibrated before or it was mis-calibrated. In such instances (e.g., where (a) and/or (b) are not met), the command Rc may be continually provided for some time and the confidence value Cc in Rc is gradually lowered. If Cc drops below a threshold value or the like, Rc is then lowered (e.g., until aperture starts actually moving such that (a) and/or (b) are met or to a lower minimum allowed by the hardware). Using such techniques, a new Rc is determined and, after measurement of a speed or speeds Sc that meets (a) and/or (b), the confidence value corresponding to Rc, Cc, is increased. Although discussed with respect to close operations, such techniques may also be applied to open operations.

Figure 7:
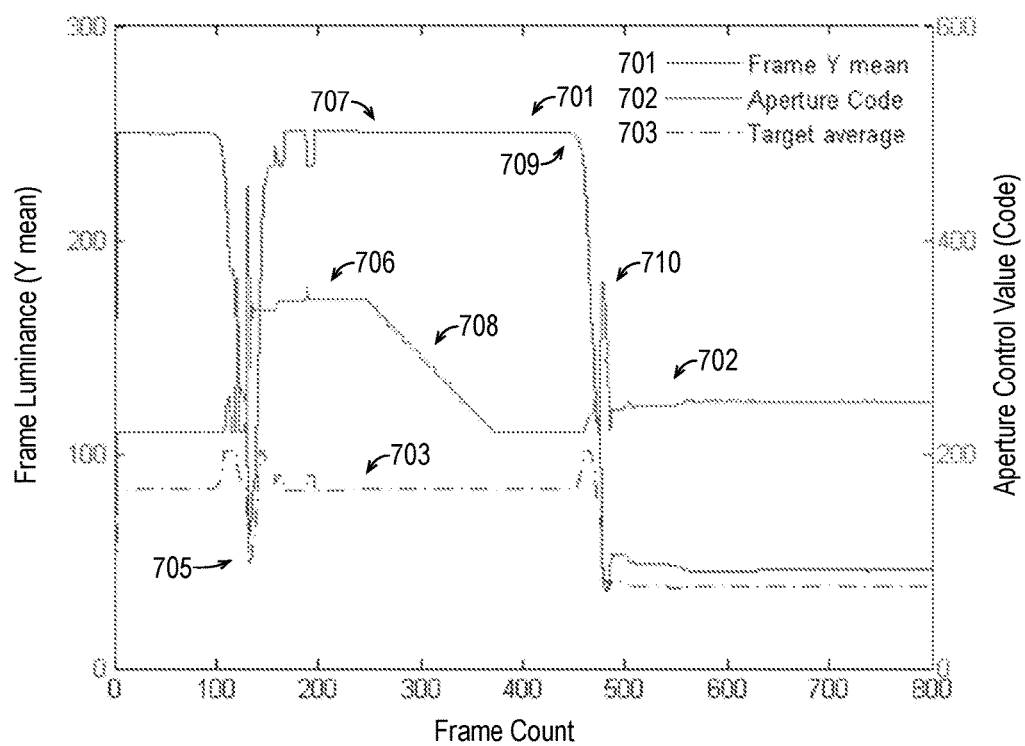
FIG. 7 illustrates an example timing diagram of an exemplary aperture calibration.

FIG. 7 illustrates an example timing diagram 700 of an exemplary aperture calibration, arranged in accordance with at least some implementations of the present disclosure. As discussed, in a case when an aperture is not closing upon repetitive request to close the aperture (with the request at the aperture maximum close control value, Rc, or any suitable aperture control close value, R, such that Rc>R>Rh), the aperture maximum close control value (e.g., the register value to close) may be decreased after a predetermined duration (e.g., a user specified duration, a preset duration, or the like). Furthermore the confidence in the aperture maximum close control value is reduced. The aperture maximum close control value may be reduced until the point when the expected rate of change (speed) in luminance (e.g., a reduction in luminance) is achieved and new reliable measurements are possible.

As shown, timing diagram 700 illustrates frame luminance (Y mean) 701, aperture control value (aperture code) 702, and target average 703 over a frame count (i.e., over time as measured by frames). As shown, after a first attempt to close the aperture (e.g., frames 0-120), an undershoot 705 occurs as indicated by frame luminance (Y mean) 701 dipping below target average 703 (solid blue line). In response, a need to open the aperture arises and, during that time, the aperture control values to close and hold the aperture were incorrectly determined. Upon requesting the aperture to close again (e.g., in frames 190-250) as indicated by plateau 706 of aperture control value (aperture code) 702. As discussed upon no change to frame luminance (Y mean) 701 (as indicated by plateau 707) for a particular duration, which in this example is about 2 seconds, the aperture maximum close control value is gradually decreased along slope 708 of aperture control value (aperture code) 702 until frame luminance (Y mean) 701 begins to move as indicated by inflection 709 of frame luminance (Y mean) 701 at around frame 459. Subsequently, the aperture control hold value may be established as discussed after an aperture open command 710 herein and the frame luminance may be maintained using the aperture control hold value indicated by aperture control value (aperture code) 702 (e.g., about 240).

As discussed, aperture control values such as aperture control values for hold, max open speed, and max close speed may be determined using feedback based on measurements of rate of change in frame luminance. In addition or in the alternative, aperture control values may be used to adjust from a current frame luminance to a target or desired frame luminance.

Figure 8:
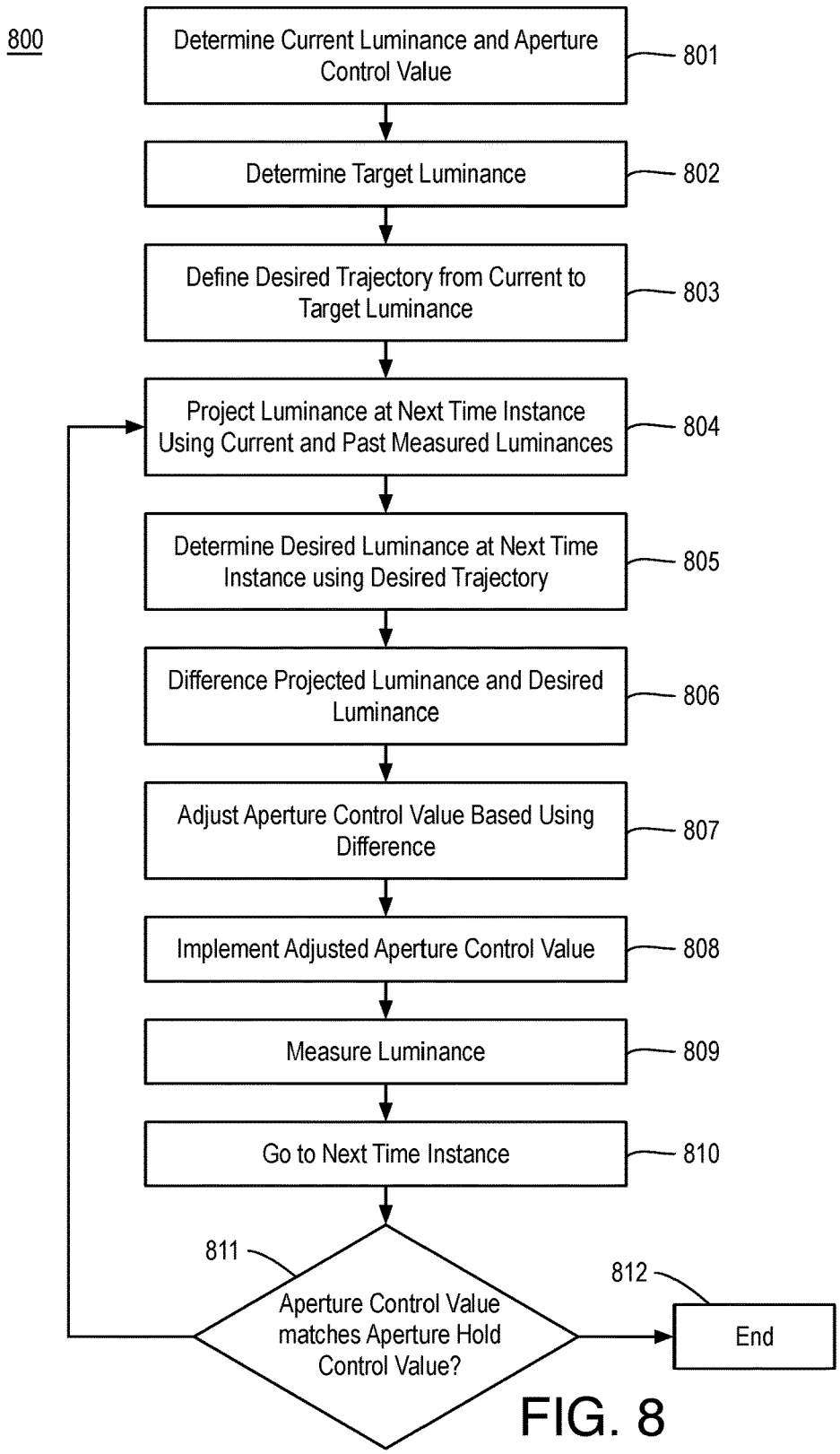
FIG. 8 illustrates an example process for providing auto aperture or iris control for an imaging device

FIG. 8 illustrates an example process 800 for providing auto aperture or iris control for an imaging device, arranged in accordance with at least some implementations of the present disclosure. Process 800 may include one or more operations 801-812 as illustrated in FIG. 8. Process 800 may be performed by an imaging device (e.g., system 100 or any other system or device discussed herein) to provide enhanced auto aperture or iris control. For example, process 800 may provide for the determination of aperture control values to provide optimal converge to a frame luminance target. The frame luminance target may be any suitable value as discussed herein. For example, the frame luminance target may be characterized as a signal target level or the like. Process 400 may be implemented to move from a current frame luminance (e.g., signal level) to a frame luminance target (e.g., target signal level) with no actions required by a user.

Process 800 may begin at operation 801, where a current frame luminance and aperture control value are determined at an imaging device. The current frame luminance and aperture control value may be determined using any suitable technique or techniques. In an embodiment, the current frame luminance is a current measured frame luminance or measured luminance as discussed herein. Furthermore, the current aperture control value may be the most recent aperture control value implemented to control an aperture opening as discussed herein. Processing may continue at operation 802, where a target frame luminance is determined. The target luminance may be determined using any suitable technique or techniques. The target luminance may be a preset value, received by a user, received by a remote signal provided to the imaging device or the like. As will be appreciated, it may be an object of process 800 to move the imaging device from the current frame luminance to the target frame luminance quickly and in a controlled manner to avoid overshoots or undershoots.

For example, assuming, based on operation 801, a current frame brightness (e.g., a brightness of an input image) of A and a current aperture control value (e.g., register value) of $R_o$ are determined and a target frame luminance of B is determined at operation 802, the object of process 800 is to change the frame brightness (e.g., image brightness) from A to B and to retain the frame brightness of B thereafter by control of the rate of change (speed) of frame brightness via the implemented aperture control value, R, such that R∈[Rc, Ro].

Processing continues at operation 803, where a target luminance or target frame luminance trajectory from the current frame brightness to the target frame brightness is defined. The target luminance trajectory may be defined using any suitable technique or techniques and the target luminance trajectory may have any suitable shape. In an embodiment, the target luminance trajectory is a smooth non-linear (e.g., curved) trajectory from the current frame brightness to the target frame brightness. In an embodiment, the target luminance trajectory is a smooth non-linear (e.g., curved) trajectory from the current frame brightness to the target frame brightness such that when the current frame brightness is greater than the target frame brightness, the curve is smooth and non-linear such that the target luminance decreases more rapidly at the beginning of the transition than toward the end. Similarly, when the current frame brightness is less than the target frame brightness, the curve may curve smooth and non-linear such that such that the target luminance increases more rapidly at the beginning of the transition than toward the end. The curved trajectory may have any suitable shape. In an embodiment, the curved trajectory asymptotically approaches the target luminance.

Figure 9:
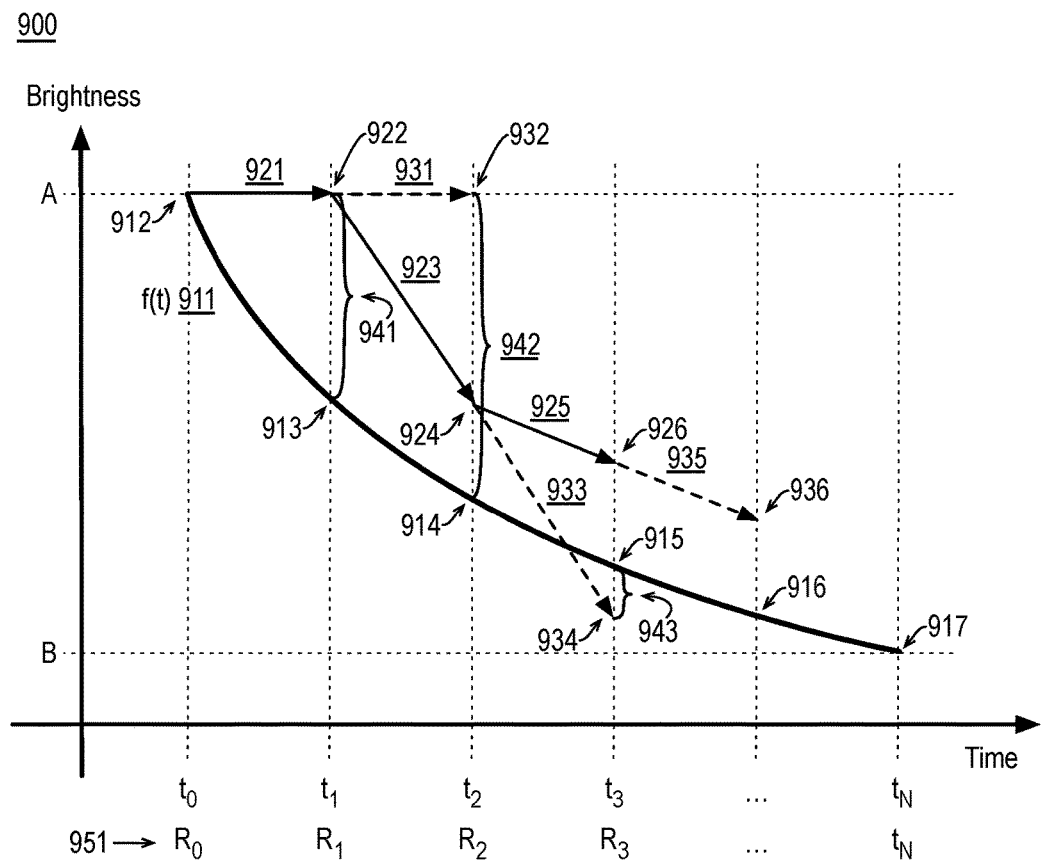
FIG. 9 illustrates an example diagram for adjusting from a current frame luminance to a target frame luminance.

FIG. 9 illustrates an example diagram 900 for adjusting from a current frame luminance to a target frame luminance, arranged in accordance with at least some implementations of the present disclosure. Diagram 900 illustrates brightness versus time as well as a sequence of aperture control values 951 over time. As shown in FIG. 9, at time to, an imaging device may attain a frame having a current frame luminance (as discussed with respect to operation 801) of A as shown with respect to point 912. Also as shown by sequence of aperture control values 951, at time to, the imaging device implemented an aperture control value of Ro. Furthermore, FIG. 9 illustrates an example target frame luminance (as discussed with respect to operation 801) of B, such that it is the object of the imaging device to move from current frame luminance, A, to target frame luminance, B.

As discussed with respect to operation 803, a target luminance trajectory from the from current frame luminance, A, to target frame luminance, B, may be defined such that the target luminance trajectory has any suitable shape. As shown in FIG. 9, a target luminance trajectory (f(t)) 911 may be defined between current frame luminance, A, and target frame luminance, B, such that target luminance trajectory 911 has a smooth upward shape since current frame luminance, A, is greater than target frame luminance, B. In examples where current frame luminance, A, is less than target frame luminance, B, target luminance trajectory 911 may have a smooth downward shape. As shown, target luminance trajectory 911 may provide for a more rapid move from current frame luminance, A, to target frame luminance, B, at the beginning of the trajectory and less rapidly at the end of the trajectory.

With reference to FIG. 8, processing continues at operation 804, where for a next time instance, a projected frame luminance may be determined. The projected frame luminance may be determined using any suitable technique or techniques. In an embodiment, the projected frame luminance is determined based on a linear extrapolation based on previous measured frame luminance and a current frame luminance (i.e., projected frame luminance=(current frame luminance−previous frame luminance)/(current time−previous time)*(next time−current time)+previous frame luminance. In an embodiment, the projected frame luminance is determined as shown in Equation (3) as follows:

$$f_p(t_2) = f_o(t_0) + \frac{f_o(t_1) - f_o(t_0)}{t_1 - t_0}(t_2 - t_0), \quad (3)$$

where the notation $f_o(\bullet)$ stands for a measured frame luminance (e.g., actual measured sensor output data mean or the like) and $f_p(\bullet)$ stands for a projected frame luminance. Equation (3) provides for an example for time instance $t_2$, but Equation (3) may be modified in a trivial manner to provide a projected frame luminance for any time instance.

Referring to FIG. 9, actual changes in measured luminance 921, 923, 925 are indicated by solid lined arrows. Also as shown in FIG. 9, projected changes in luminance 931, 933, 935 are indicated by hatched lined arrows. For example, with respect to projected change in luminance 931, from point 922 (a measured frame luminance), a projected luminance at point 932 may be determined by extrapolating to point 932 using point 922 and point 912. Similarly, with respect to projected change in luminance 933, from point 924 (a measured frame luminance), a projected luminance at point 934 may be determined by extrapolating to point 934 from point 924 and point 922. Also, with respect to projected change in luminance 935, from point 926 (a measured frame luminance), a projected luminance at point 936 may be determined by extrapolating to point 936 from point 926 and point 924.

With reference to FIG. 8, processing continues at operation 805, where, for a next time instance, a target or desired luminance. For example, the target or desired luminance may be characterized as a next time instance target luminance. The next time instance target luminance may be determined using any suitable technique or techniques. In an embodiment, the next time instance target luminance is determined based on determining a point on the target luminance trajectory for the next time instance. Referring to FIG. 9, for time instance $t_1$, a point 913 may be determined along target luminance trajectory 911 such that point 913 provides the target or desired luminance for time instance $t_1$. Similarly, for time instance $t_2$, a point 914 may be determined along target luminance trajectory 911 such that point 914 provides the target or desired luminance for time instance $t_2$. Such processing may be provided for any time instance as shown with respect to point 915 and time instance $t_3$, point 916 and an intermediate time instance, and point 917 and time instance $t_N$.

Returning to FIG. 8, processing continues at operation 806, where, for the next time instance, the projected frame luminance and the target frame luminance may be differenced. The projected frame luminance and the target frame luminance may be differenced using any suitable technique or techniques such as subtracting the projected frame luminance from the target frame luminance. For iterations (e.g., time instances) where a projected frame luminance is not available, the measured frame luminance and the target frame luminance may be differenced.

With reference to FIG. 9, for time instance $t_1$, a difference 941 may be determined between the luminance of point 922 (i.e. the measured frame luminance at time $t_1$) and the luminance of point 913 (i.e. the target frame luminance at time $t_1$). As discussed, the measured frame luminance may be used since a projected frame luminance is not available. Also as shown, for time instance $t_2$, a difference 942 may be determined between the luminance of point 932 (i.e. the projected frame luminance at time $t_2$) and the luminance of point 914 (i.e. the target frame luminance at time $t_2$). Similarly, for time instance $t_3$, a difference 943 may be determined between the luminance of point 934 (i.e. the projected frame luminance at time $t_3$) and the luminance of point 915 (i.e. the target frame luminance at time $t_4$). Such processing may be provided for any time instance as processing continues.

Again with reference to FIG. 8, processing continues at operation 807, where the aperture control value may be adjusted (or determined) based on the difference. The adjusted aperture control value may be determined using any suitable technique or techniques. In an embodiment, the adjusted aperture control value is determined by multiplying the difference attained at operation 806 by a speed (or rate of change) adjustment factor and adding the result to the current aperture control value. In an embodiment, the adjusted aperture control value is determined as shown in Equation (4) as follows:

$$R_2 = R_1 + k \frac{f(t_2) - f_p(t_2)}{t_2 - t_1} \quad (4)$$

where $R_2$ is the adjusted aperture control value for time $t_2$, $R_1$ is the aperture control value at time $t_1$, $f(t_2)$ is a function defining the target luminance trajectory, $f_p(t_2)$ is the projected frame luminance at time $t_2$, and k is a speed (or rate of change) adjustment factor to provide control over how fast the rate of change in frame luminance is changed. The speed (or rate of change) adjustment factor may be any suitable value such as a value in the range of 0.5 to 0.9 or the like. Equation (4) provides for an example for time instance $t_2$, but Equation (4) may be modified in a trivial manner to provide a projected frame luminance for any time instance. Furthermore, a difference between the current measured frame luminance level, $f_o(\bullet)$, and the target luminance, B, defines the direction of aperture movement such that a close aperture command is provided when $(f_o(\bullet)>B)$, an open aperture command is provided when $(f_o(\bullet)<B)$, and a hold that aperture command is provided when $(f_o(\bullet) \cong B)$.

In an embodiment, the adjusted aperture control value may be determined with reference to the aperture control hold value, Rh, as discussed herein and as is shown in Equation (5) as follows:

$$R_{i+1} = Rh + \frac{f_p(t_{i+1}) - B}{f_o(t_i) - B}(R_i - Rh) \quad (5)$$

where $R_{i+1}$ is the adjusted aperture control value for time $t_{i+1}$, $R_h$ is the aperture control hold value at time $t_1$, $f_p$ is a projected frame luminance, $f_o$ is a measured frame luminance, and B is the target frame luminance. In an embodiment, the ratio on the right side of Equation (5) may be multiplied by a speed (or rate of change) adjustment factor as discussed with respect to Equation (4). As discussed, the aperture is to be closed when $(f_o(\bullet)>B)$, opened when $(f_o(\bullet)<B)$, and held when $(f_o(\bullet) \cong B)$.

As discussed, the projected frame luminance may be determined using linear extrapolation techniques. In an embodiment, the projected frame luminance may be determined as shown in Equation (6) as follows:

$$f_p(t_{i+1}) = F_o(t_i, t_{i-1}, \ldots, t_{i-K}) \quad (6)$$

where K is the number of samples in a maintained history of projected and measured frame luminance values and $F_o$ provides a function to determine the projected frame luminance value for a next time instance. For example, if the response due to implementation of the aperture control value to the measured frame luminance value associated therewith is delayed, function $F_o$ provides for such a delay to be taken into account. For example, as shown in Equation (7), for linear approximation with K=2, function $F_o$ may be provided as follows:

$$f_p(t_{i+1}) = f_o(t_{i-1}) + \frac{f_o(t_i) - f_o(t_{i-1})}{t_i - t_{i-1}}(t_{i+1} - t_{i-1}). \quad (7)$$

such that for the determination of a projected frame luminance value for a next time instance, i+1, extrapolation is performed based on a previous time instance, i−1. Continuing the above example, the adjusted aperture control value may then be determined as shown in Equation (8).

$$R_{i+1} = R_i + \frac{f_p(t_{i+1}) - f_o(t_i)}{B - f_o(t_i)}(Rh - R_i), \quad (8)$$

such that the adjusted aperture control value is based on a previous aperture control value, the aperture control hold value, the projected frame luminance value determined using Equation (7), a previous measured frame luminance value, and the target frame luminance value. As discussed, the aperture is to be closed when $(f_o(\bullet)>B)$, opened when $(f_o(\bullet)<B)$, and held when $(f_o(\bullet) \cong B)$ (such that $R_{i+1}=Rh$).

With reference to FIG. 9, the adjusted aperture control value, $R_2$ or $R_{i+1}$ or the lie, is implemented at time $t_2$ or $t_{i+1}$, and subsequent aperture control values (i.e., $R_3$ to $R_N$) are implemented at subsequent time instances (i.e., $t_3$ to $t_N$). In the discussed embodiments, the aperture control values may be limited to be in the range of $R_{i+1} \in [Rc, Ro]$ such that any implemented aperture control value does not exceed the aperture maximum close control value or the aperture maximum open control value.

Returning to FIG. 8, processing continues at operation 808, where the adjusted aperture control value is implemented, and at operation 809, where a frame luminance is measured to determine a measured frame luminance or brightness for continued processing. Processing continues at operation 810 where processing continues to a next time instance and at decision operation 811. At decision operation 811, a determination may be made as to whether continued aperture control value adjustments are to be made. The determination may be made using any suitable technique or techniques. In the illustrated embodiment, a determination may be made as to whether the current aperture control value matches (e.g., is within a predetermined threshold of) the aperture hold control value. If so, processing ends at operation 812 and, if not, processing continues at operation 804 as discussed above. In another embodiment, a determination may be made as to whether the frame luminance measured at operation 809 matches (e.g., is within a predetermined threshold of) the target frame luminance. If so, processing ends at operation 812 and the aperture control value may be optionally set to the aperture hold control value and, if not, processing continues at operation 804 as discussed above.

Iterations of process 800 may be repeated any number of times to attain the target frame luminance. Furthermore, process 800 may be repeated any number of times for adjustments between a current frame luminance and target frame luminance as discussed herein.

Figure 10:
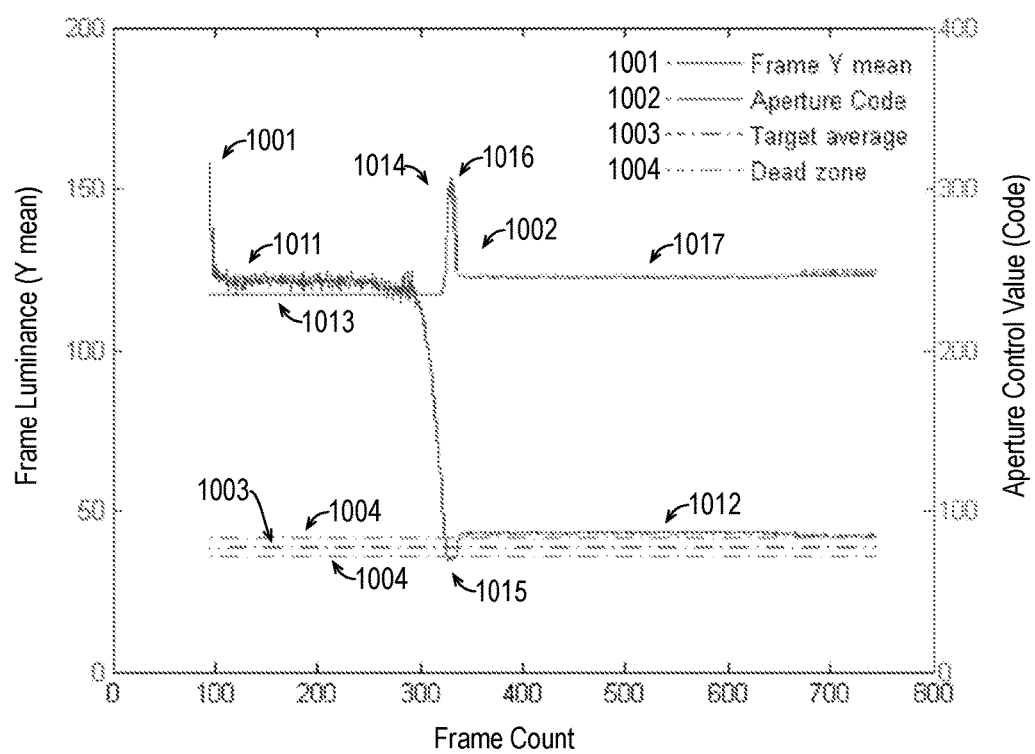
FIG. 10 illustrates an example chart of an exemplary convergence to a target frame luminance value.

As discussed, process 800 may provide convergence to a target frame luminance value. FIG. 10 illustrates an example chart 1000 of an exemplary convergence to a target frame luminance value, arranged in accordance with at least some implementations of the present disclosure. In an embodiment, process 800 may be performed after each of the aperture control hold value, Rh, the aperture maximum close control value, Rc, and the aperture maximum open control value, Ro, are determined or calibrated as discussed herein. For example, chart 100 may illustrate ideal behavior when such control parameters that need to be calibrated are calibrated or set to ideal values. As shown in FIG. 10, an adjustment may be made from frame luminance 1011 to frame luminance 1012 of measured frame luminance (frame Y mean) 1001, which is close to frame luminance target (target average) 1003. As shown, a dead zone 1004 may surround frame luminance target (target average) 1003. For example, an aperture close command such as an aperture maximum close control value may be is issued in frames 80-300 as illustrated by region 1013 of implemented aperture control values (aperture code) 1002. Also as shown, the speed of the closing aperture may be corrected by gradually increasing the aperture control value (e.g., register value) as shown with respect to region 1014 of implemented aperture control values (aperture code) 1002, after which a slight undershoot 1015 occurs around frames 320 as shown with respect to frame luminance 1012. Thereafter, an aperture open command is provided via a change in the aperture control value as shown with respect to region 1016 of implemented aperture control values (aperture code) 1002. Subsequently, the aperture control values are provided to correct to the frame luminance target (target average) 1003, which is about 40 in this example. As shown with respect to region 1017 of aperture control values (aperture code) 1002 (e.g., from about frame 350 and onwards), the frame luminance target (target average) 1003 is held or maintained by holding the aperture using the aperture control hold value, Rh, which is about 240 in this example.

Figure 11:
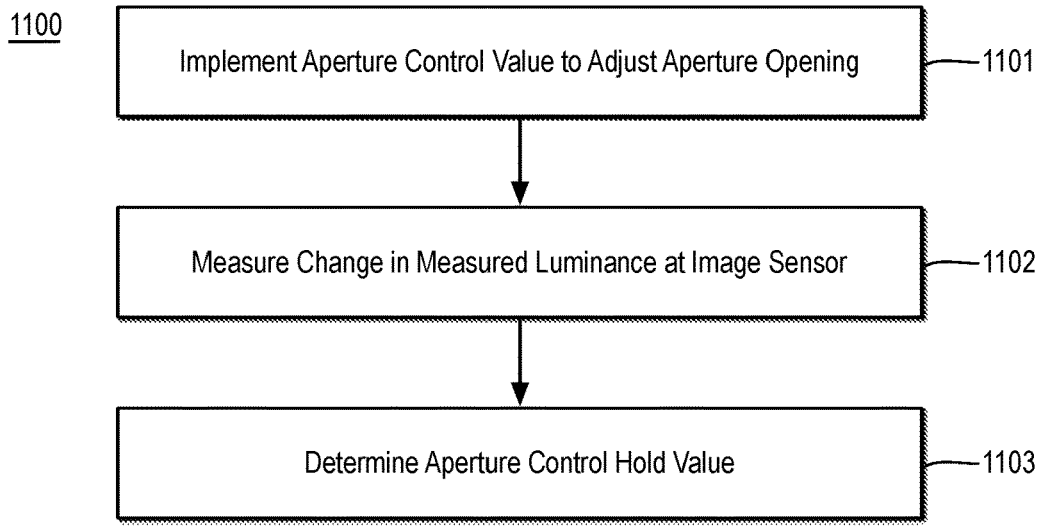
FIG. 11 is a flow diagram illustrating an example process providing auto iris control for an imaging device.

FIG. 11 is a flow diagram illustrating an example process 1100 providing auto iris control for an imaging device, arranged in accordance with at least some implementations of the present disclosure. Process 1100 may include one or more operations 1101-1103 as illustrated in FIG. 11. Process 1100 may form at least part of an automatic iris or aperture control process. By way of non-limiting example, process 1100 may form at least part of an automatic auto iris control process as performed by device 100, by architecture, 200, or any other imaging device or system as discussed herein. Furthermore, process 1100 will be described herein with reference to system 1200 of FIG. 12.

Figure 12:
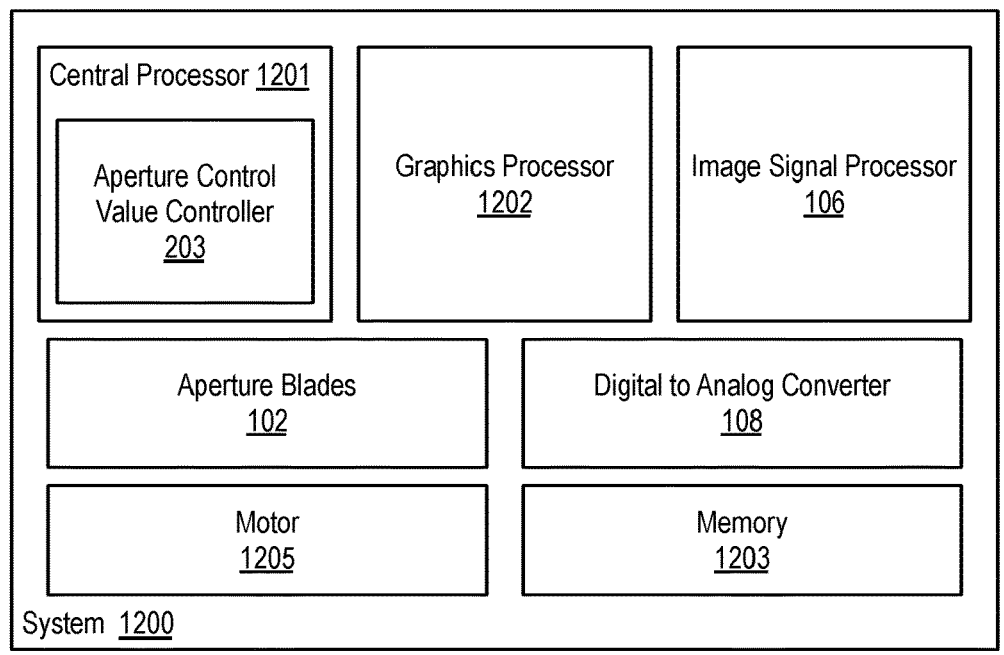
FIG. 12 is an illustrative diagram of an example imaging device providing auto iris control for image or video capture.

FIG. 12 is an illustrative diagram of an example imaging device 1200 providing auto iris control for image or video capture, arranged in accordance with at least some implementations of the present disclosure. As shown in FIG. 12, imaging device 1200 may include a central processor 1201, which may implement aperture control value controller 203, a graphics processor 1202, a memory 1203, a motor 1205, aperture blades 102, image signal processor 106, and digital to analog converter 108. Imaging device 1200 may also include any components or modules discussed with respect to system 100, architecture 200, or elsewhere herein. In some embodiments, imaging device 1200 includes lens 103, and image sensor 104. As shown, imaging device 1200 may include motor 1205 or any suitable motor to adjust an aperture via aperture blades 102 or the like based on a signal (e.g., an aperture control value) as provided by digital to analog converter 108 in response to an aperture control value from aperture control value controller 203 as discussed herein. For example, motor 1205 may implement one or more of voltage supply 109, coil 110, magnet 105, spring 111, or the like to adjust aperture blades 102. Furthermore, imaging device 1200 may include an optional display. Also as shown, central processor 1201 may include or implement aperture control value controller 203, which may perform any operations discussed herein with respect to processes 400, 500, 600, 800, 1100 or those discussed elsewhere herein. In the example of imaging device 1200, memory 1203 may store image data, frame brightness data, aperture control values, aperture control hold values, aperture maximum close control values, aperture maximum open control values, or any other data discussed herein.

In an embodiment, imaging device 1200 includes a motor such as motor 1205 to adjust a size of an aperture opening adjacent to a lens, an image sensor adjacent to the lens, and a controller such as aperture control value controller 203 coupled to the motor to determine and provide aperture control values to the motor to adjust the aperture opening. In some embodiments, the controller is coupled to the motor via a digital to analog converter as discussed herein.

As shown, in some examples, aperture control value controller 203 may be implemented via central processor 1201. In other examples, aperture control value controller 203 or portions thereof may be implemented via graphics processor 1202, image signal processor 106, an image processing unit, an image processing pipeline, or the like. In some examples, aperture control value controller 203 or portions thereof may be implemented in hardware as a system-on-a-chip (SoC).

Graphics processor 1202 may include any number and type of graphics processing units that may provide the operations as discussed herein. Such operations may be implemented via software or hardware or a combination thereof. For example, graphics processor 1202 may include circuitry dedicated to manipulate and/or analyze images obtained from memory 1203. Central processor 1201 may include any number and type of processing units or modules that may provide control and other high level functions for imaging device 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, aperture control value controller 203 or portions thereof may be implemented via an execution unit (EU) of graphics processor 1202. The EU may include, for example, programmable logic or circuitry such as a logic core or cores that may provide a wide array of programmable logic functions. In an embodiment, aperture control value controller 203 or portions thereof may be implemented via dedicated hardware such as fixed function circuitry of an image processor or the like. Fixed function circuitry may include dedicated logic or circuitry and may provide a set of fixed function entry points that may map to the dedicated logic for a fixed purpose or function.

Returning to discussion of FIG. 11, process 1100 may begin at operation 1101, where a first aperture control value may be implemented to adjust an aperture opening of the imaging device. For example, aperture control value controller 203 may provide the first aperture control value to control a motor to adjust an aperture opening. The first aperture control value may be any suitable aperture control value such as an aperture maximum close control value, Rc, an aperture maximum open control value, Ro, or the like.

Processing may continue at operation 1102, where a rate of change in measured luminance at an image sensor of the imaging device may be measured in response to implementing the first aperture control value. In an embodiment, the rate of change in measured luminance is a difference between a first measured frame luminance and a second measured frame luminance subsequent to the first measured frame luminance over time. For example, an image sensor may detect incoming light and provide an image signal to image signal processor 106, which may determine the measured luminance. In an embodiment, the measured frame luminance is a mean luminance value from demosaiced and downsampled frames attained by the image sensor.

Processing may continue at operation 1103, where an aperture control hold value may be determined based on the first aperture control value and the rate of change in measured luminance such that the aperture control hold value is to hold the aperture opening at a current opening size or a current position. The aperture control hold value may be determined using any suitable technique or techniques. In an embodiment, the aperture control hold value is determined by a linear interpolation to find an aperture control value corresponding to a zero rate of change in measured luminance. For example, the first aperture control value and the rate of change in measured luminance may be used with a second aperture control value and a second rate of change in measured luminance to interpolate an aperture control value corresponding to a zero rate of change in measured luminance.

In an embodiment, the first aperture control value is to close the aperture opening and process 1100 further includes implementing a second aperture control value to adjust the aperture opening of the imaging device such that the second aperture control value is to open the aperture opening and measuring a second rate of change in measured luminance at the image sensor in response to implementing the second aperture control value. In such embodiments, determining the aperture control hold value may include an interpolation of the first aperture control value, the rate of change in measured luminance, the second aperture control value, and the second rate of change in measured luminance to determine the aperture control hold value at or near a zero rate of change in luminance.

As discussed, process 1100 may provide for the determination of an aperture control hold value. In some embodiments, process 1100 may also include rejecting invalid measured rate of changes in measured luminance, determining confidence values corresponding to implemented aperture control values, determining aperture control values to adjust from a measured frame luminance value and a target frame luminance value, or any combination thereof.

In some embodiments, process 1100 further includes implementing a second aperture control value to adjust the aperture opening of the imaging device, determining an expected rate of change in luminance based on the second aperture control value, measuring a second rate of change in measured luminance at the image sensor in response to implementing the second aperture control value, and determining, when the expected rate of change in luminance is within a threshold of the second rate of change in measured luminance, a second aperture control hold value based on the second aperture control value and the second rate of change in measured luminance or discarding, when the expected rate of change in luminance is not within the threshold of the second rate of change in measured luminance, the second rate of change in measured luminance.

In some embodiments, process 1100 further includes implementing a second aperture control value to adjust the aperture opening of the imaging device, determining an expected rate of change in luminance based on the second aperture control value, measuring a second rate of change in measured luminance at the image sensor in response to implementing the second aperture control value, and increasing, when the expected rate of change in luminance is within a threshold of the second rate of change in measured luminance, a confidence level corresponding to the second aperture control value or decreasing, when the expected rate of change in luminance is not within the threshold of the second rate of change in measured luminance, the confidence level corresponding to the second aperture control value. Such embodiments may further include implementing, when the expected rate of change in luminance is within the threshold of the second rate of change in measured luminance and subsequent to said increasing the confidence level, the second aperture control value to adjust the aperture opening of the imaging device, measuring a third rate of change in measured luminance at the image sensor in response to implementing the second aperture control value, and updating one of the aperture control hold value, an aperture maximum close control value, or an aperture maximum open control value based on a weighted average of the second rate of change and the third rate of change.

In some embodiments, process 1100 further includes implementing a second aperture control value to adjust the aperture opening to attain a target luminance by determining a target luminance trajectory to the target luminance, determining, for a next time instance, a difference between a projected luminance based on a current aperture control value and a next time instance target luminance along the target luminance trajectory, and selecting the second aperture control value by adjusting the current aperture control value based on the difference. In such embodiments, the target luminance trajectory may include a smooth non-linear target luminance trajectory, the projected luminance may include a linear extrapolation from a current measured luminance based on a previous measured luminance, and selecting the second aperture control value may include multiplying the difference by a speed adjustment factor and adding the result to the current aperture control value.

Process 1100 may be repeated any number of times either in series or in parallel for any number of auto iris or aperture control functions or the like. As discussed, process 1100 may provide for automatic iris or aperture control for an imaging device.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
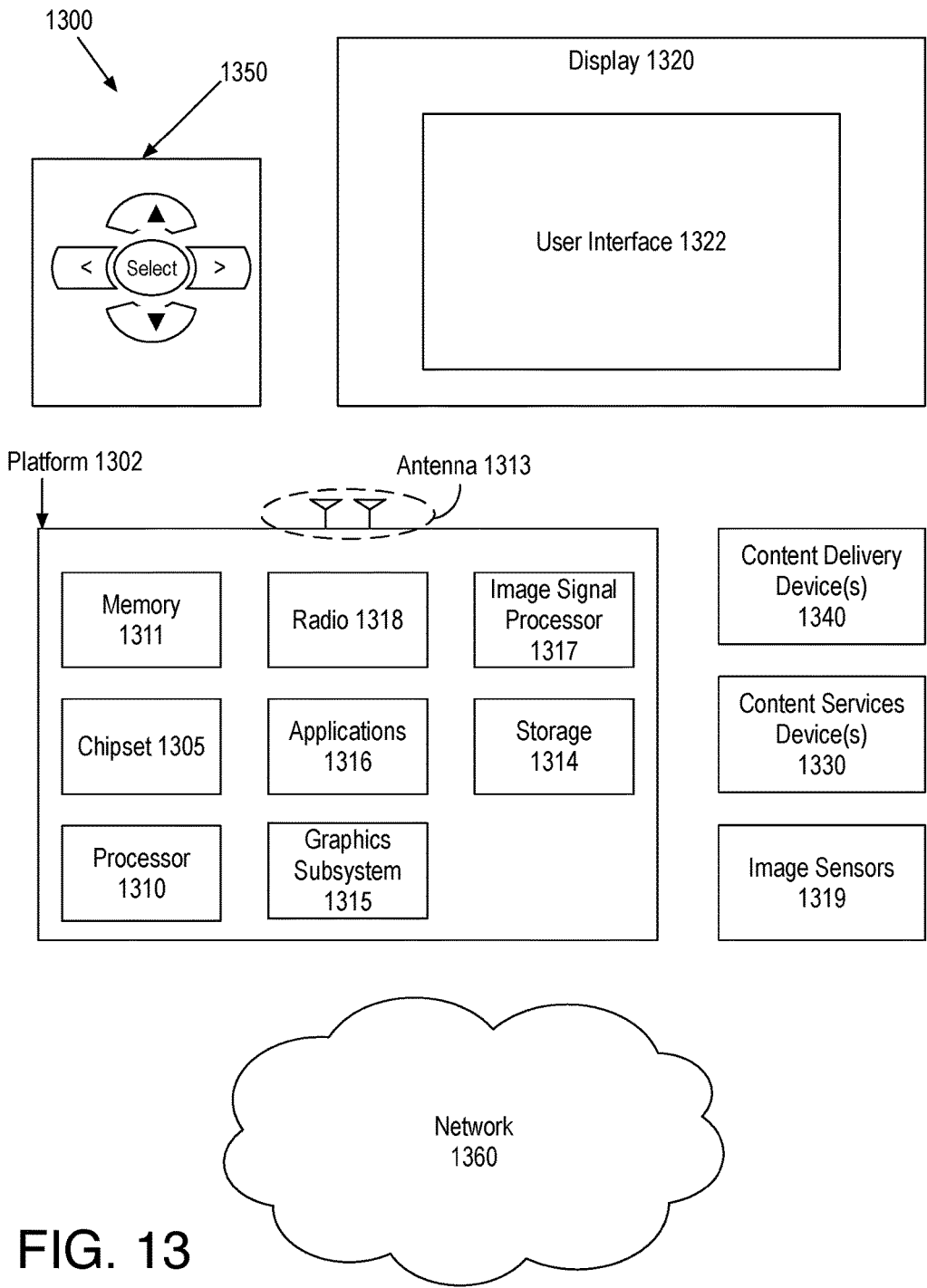
FIG. 13 is an illustrative diagram of an example system.

FIG. 13 is an illustrative diagram of an example system 1300, arranged in accordance with at least some implementations of the present disclosure. In various implementations, system 1300 may be a mobile device system although system 1300 is not limited to this context. For example, system 1300 may be incorporated into a surveillance camera, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, camera (e.g. point-and-shoot cameras, super-zoom cameras, digital single-lens reflex (DSLR) cameras), and so forth. System 1300 may perform any functions discussed herein and system 1300 may include any components or modules discussed herein.

In various implementations, system 1300 includes a platform 1302 coupled to a display 1320. Platform 1302 may receive content from a content device such as content services device(s) 1330 or content delivery device(s) 1340 or other content sources such as image sensors 1319. For example, platform 1302 may receive image data as discussed herein from image sensors 1319 or any other content source. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1311, antenna 1313, storage 1314, graphics subsystem 1315, applications 1316, image signal processor 1317 and/or radio 1318. Chipset 1305 may provide intercommunication among processor 1310, memory 1311, storage 1314, graphics subsystem 1315, applications 1316, image signal processor 1317 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1311 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Image signal processor 1317 may be implemented as a specialized digital signal processor or the like used for image processing. In some examples, image signal processor 1317 may be implemented based on a single instruction multiple data or multiple instruction multiple data architecture or the like. In some examples, image signal processor 1317 may be characterized as a media processor. As discussed herein, image signal processor 1317 may be implemented based on a system on a chip architecture and/or based on a multi-core architecture.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

Image sensors 1319 may include any suitable image sensors that may provide image data based on a scene. For example, image sensors 1319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1319 may include any device that may detect information of a scene to generate image data.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

As described above, system 1300 may be embodied in varying physical styles or form factors.

Figure 14:
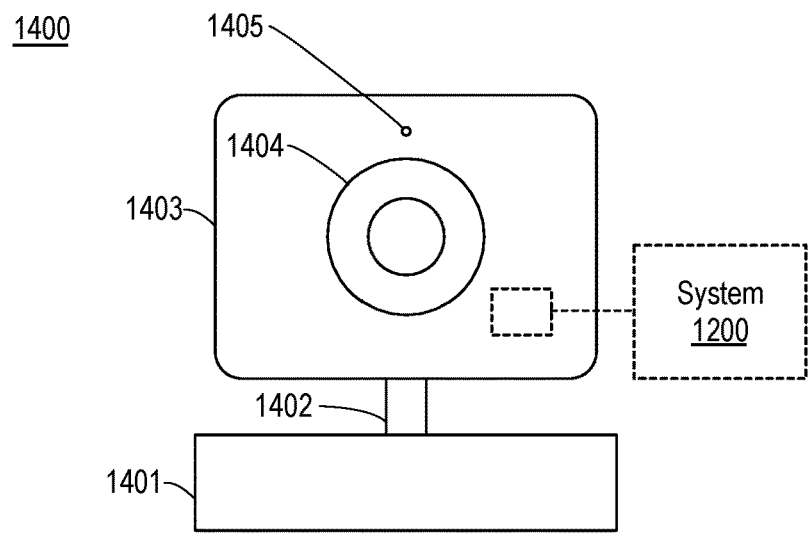
FIG. 14 illustrates an example surveillance camera device.

FIG. 14 illustrates an example surveillance camera device 1400, arranged in accordance with at least some implementations of the present disclosure. In some embodiments, system 1200, system 1300, or any other systems, devices such as device 100 or portions thereof may be implemented via surveillance camera device 1400. In various embodiments, for example, surveillance camera device 1400 may be implemented as a digital security surveillance (DSS) device. A DSS device may refer to any device having a camera, a processing system, and a storage or communications capability to store or transmit attained surveillance images.

As shown in FIG. 14, surveillance camera device 1400 may include a base 1401, a coupling 1402, and a camera housing 1403 coupled to base 1401 via coupling 1402. Also as shown, surveillance camera device 1400 includes a camera 1404 and a motion detector 1405. For example, surveillance camera device 1400 may implement aperture control value controller 203 using techniques discussed herein to calibrate and provide control to a motor to control or adjust aperture blades implemented by camera 1404 to provide auto aperture or auto iris control as discussed herein. Although illustrated with camera 1404 coupled to base 1401 via coupling 1402, in some embodiments, no base 1401 and coupling 1402 may be provided and housing 1403 including camera 1404 may be mounted using any suitable technique or techniques to provide surveillance for a scene.

Figure 15:
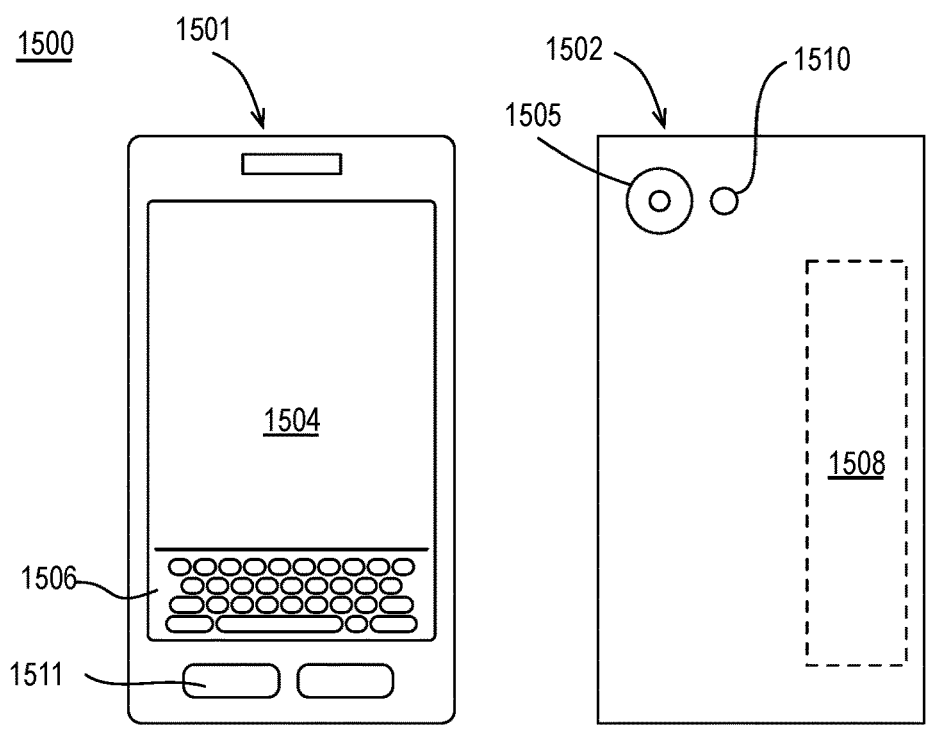
FIG. 15 illustrates an example small form factor device, all arranged in accordance with at least some implementations of the present disclosure.

FIG. 15 illustrates an example small form factor device 1500, arranged in accordance with at least some implementations of the present disclosure. In some examples, system 1200, system 1300, or any other systems, devices such as device 100 or portions thereof may be implemented via device 1500. In various embodiments, for example, device 1500 may be implemented as a mobile computing device having wireless capabilities. A mobile computing device may refer to any device having a processing system and a mobile power source or supply, such as one or more batteries, for example. Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1511. I/O device 1506 may include any suitable I/O device for entering information into a mobile computing device.

Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and/or flash 1510 may be integrated into front 1501 of device 1500 and/or additional cameras (e.g., such that device 1500 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, an imaging device comprises a motor to adjust a size of an aperture opening adjacent to a lens, an image sensor adjacent to the lens, and a controller coupled to the motor, the controller to provide a first aperture control value to control the motor to adjust the aperture opening, to determine a rate of change in measured luminance at the image sensor in response to implementation of the first aperture control value, and to determine an aperture control hold value based on the first aperture control value and the rate of change in measured luminance, such that the aperture control hold value is to hold the aperture opening at a current opening size.

In one or more second embodiments, further to the first embodiments, the first aperture control value is to close the aperture opening, the controller further to provide a second aperture control value to control the motor to adjust the aperture opening, such that the second aperture control value is to open the aperture opening, to determine a second rate of change in measured luminance at the image sensor in response to implementation of the second aperture control value, such that the controller to determine the aperture control hold value comprises the controller to perform an interpolation of the first aperture control value, the rate of change in measured luminance, the second aperture control value, and the second rate of change in measured luminance to determine the aperture control hold value at or near a zero rate of change in luminance.

In one or more third embodiments, further to the first or second embodiments, the controller is further to provide a second aperture control value to control the motor to adjust the aperture opening, to determine an expected direction of change in luminance based on the second aperture control value, to determine a second rate of change in measured luminance at the image sensor in response to implementation of the second aperture control value, and to determine, when the expected direction of change in luminance matches a direction of the second rate of change in measured luminance, a second aperture control hold value based on the second aperture control value and the second rate of change in measured luminance or to discard, when the expected direction of change in luminance does not match the direction of the second rate of change in measured luminance, the second rate of change in measured luminance.

In one or more fourth embodiments, further to the first through third embodiments, the controller is further to provide a second aperture control value to control the motor to adjust the aperture opening, to determine an expected rate of change in luminance based on the second aperture control value, to determine a second rate of change in measured luminance at the image sensor in response to implementation of the second aperture control value, and to determine, when the expected rate of change in luminance is within a threshold of the second rate of change in measured luminance, a second aperture control hold value based on the second aperture control value and the second rate of change in measured luminance or to discard, when the expected rate of change in luminance is not within the threshold of the second rate of change in measured luminance, the second rate of change in measured luminance.

In one or more fifth embodiments, further to the first through fourth embodiments, the controller is further to provide a second aperture control value to control the motor to adjust the aperture opening, to determine an expected rate of change in luminance based on the second aperture control value, to determine a second rate of change in measured luminance at the image sensor in response to implementation of the second aperture control value, and to increase, when the expected rate of change in luminance is within a threshold of the second rate of change in measured luminance, a confidence level corresponding to the second aperture control value or decrease, when the expected rate of change in luminance is not within the threshold of the second rate of change in measured luminance, the confidence level corresponding to the second aperture control value.

In one or more sixth embodiments, further to the first through fifth embodiments, the controller is further to provide, when the expected rate of change in luminance is within the threshold of the second rate of change in measured luminance and subsequent to said increase of the confidence level, the second aperture control value to control the motor to adjust the aperture opening, to determine a third rate of change in measured luminance at the image sensor in response to implementation of the second aperture control value, and to update one of the aperture control hold value, an aperture maximum close control value, or an aperture maximum open control value based on a weighted average of the second rate of change and the third rate of change.

In one or more seventh embodiments, further to the first through sixth embodiments, the controller is further to provide an aperture maximum close control value to control the motor to close the aperture opening of the imaging device, to determine a second rate of change in measured luminance at the image sensor in response to implementation of the aperture maximum close control value, and to, when the second rate of change in measured luminance indicates no change or an increase in measured luminance, adjust the aperture maximum close control value, such that the aperture maximum close control value is to close the aperture opening at a predetermined maximum close speed.

In one or more eighth embodiments, further to the first through seventh embodiments, the controller is further to implement a second aperture control value to control the motor to adjust the aperture opening to attain a target luminance, such that the controller to implement the second aperture control value comprises the controller to determine a target luminance trajectory to the target luminance, determine, for a next time instance, a difference between a projected luminance based on a current aperture control value and a next time instance target luminance along the target luminance trajectory, and to select the second aperture control value by an adjustment of the current aperture control value based on the difference.

In one or more ninth embodiments, further to the first through eighth embodiments, the target luminance trajectory comprises a smooth non-linear target luminance trajectory, such that the projected luminance comprises a linear extrapolation from a current measured luminance based on a previous measured luminance, and the controller to select the second aperture control value comprises the controller to multiply the difference by a speed adjustment factor and add the result to the current aperture control value.

In one or more tenth embodiments, further to the first through ninth embodiments, the rate of change in measured luminance comprises a difference between a first measured frame luminance and a second measured frame luminance subsequent to the first measured frame luminance over time, and such that the first measured frame luminance and the second measured frame luminance comprise mean luminance values from downsampled frames attained by the image sensor.

In one or more eleventh embodiments, a method for providing auto iris control for an imaging device comprises implementing a first aperture control value to adjust an aperture opening of the imaging device, measuring a rate of change in measured luminance at an image sensor of the imaging device in response to implementing the first aperture control value, and determining an aperture control hold value based on the first aperture control value and the rate of change in measured luminance, such that the aperture control hold value is to hold the aperture opening at a current opening size.

In one or more twelfth embodiments, further to the eleventh embodiments, the first aperture control value is to close the aperture opening and the method further comprises implementing a second aperture control value to adjust the aperture opening of the imaging device, such that the second aperture control value is to open the aperture opening and measuring a second rate of change in measured luminance at the image sensor in response to implementing the second aperture control value, such that determining the aperture control hold value comprises an interpolation of the first aperture control value, the rate of change in measured luminance, the second aperture control value, and the second rate of change in measured luminance to determine the aperture control hold value at or near a zero rate of change in luminance.

In one or more thirteenth embodiments, further to the eleventh or twelfth embodiments, the method further comprises providing a second aperture control value to control the motor to adjust the aperture opening, determining an expected direction of change in luminance based on the second aperture control value, determining a second rate of change in measured luminance at the image sensor in response to implementation of the second aperture control value, and determining, when the expected direction of change in luminance matches a direction of the second rate of change in measured luminance, a second aperture control hold value based on the second aperture control value and the second rate of change in measured luminance or discarding, when the expected direction of change in luminance does not match the direction of the second rate of change in measured luminance, the second rate of change in measured luminance.

In one or more fourteenth embodiments, further to the eleventh through thirteenth embodiments, the method further comprises implementing a second aperture control value to adjust the aperture opening of the imaging device, determining an expected rate of change in luminance based on the second aperture control value, measuring a second rate of change in measured luminance at the image sensor in response to implementing the second aperture control value, and determining, when the expected rate of change in luminance is within a threshold of the second rate of change in measured luminance, a second aperture control hold value based on the second aperture control value and the second rate of change in measured luminance or discarding, when the expected rate of change in luminance is not within the threshold of the second rate of change in measured luminance, the second rate of change in measured luminance.

In one or more fifteenth embodiments, further to the eleventh through thirteenth embodiments, the method further comprises implementing a second aperture control value to adjust the aperture opening of the imaging device, determining an expected rate of change in luminance based on the second aperture control value, measuring a second rate of change in measured luminance at the image sensor in response to implementing the second aperture control value, and increasing, when the expected rate of change in luminance is within a threshold of the second rate of change in measured luminance, a confidence level corresponding to the second aperture control value or decreasing, when the expected rate of change in luminance is not within the threshold of the second rate of change in measured luminance, the confidence level corresponding to the second aperture control value.

In one or more sixteenth embodiments, further to the eleventh through fifteenth embodiments, the method further comprises implementing, when the expected rate of change in luminance is within the threshold of the second rate of change in measured luminance and subsequent to said increasing the confidence level, the second aperture control value to adjust the aperture opening of the imaging device, measuring a third rate of change in measured luminance at the image sensor in response to implementing the second aperture control value, and updating one of the aperture control hold value, an aperture maximum close control value, or an aperture maximum open control value based on a weighted average of the second rate of change and the third rate of change.

In one or more seventeenth embodiments, further to the eleventh through sixteenth embodiments, the method further comprises providing an aperture maximum close control value to control the motor to close the aperture opening of the imaging device, determining a second rate of change in measured luminance at the image sensor in response to implementation of the aperture maximum close control value, and when the second rate of change in measured luminance indicates no change or an increase in measured luminance, adjusting the aperture maximum close control value, such that the aperture maximum close control value is to close the aperture opening at a predetermined maximum close speed.

In one or more eighteenth embodiments, further to the eleventh through seventeenth embodiments, the method further comprises implementing a second aperture control value to adjust the aperture opening to attain a target luminance by determining a target luminance trajectory to the target luminance, determining, for a next time instance, a difference between a projected luminance based on a current aperture control value and a next time instance target luminance along the target luminance trajectory, and selecting the second aperture control value by adjusting the current aperture control value based on the difference.

In one or more nineteenth embodiments, further to the eleventh through eighteenth embodiments, the target luminance trajectory comprises a smooth non-linear target luminance trajectory, such that the projected luminance comprises a linear extrapolation from a current measured luminance based on a previous measured luminance, and selecting the second aperture control value comprises multiplying the difference by a speed adjustment factor and adding the result to the current aperture control value.

In one or more twentieth embodiments, further to the eleventh through nineteenth embodiments, the rate of change in measured luminance comprises a difference between a first measured frame luminance and a second measured frame luminance subsequent to the first measured frame luminance over time, and such that the first measured frame luminance and the second measured frame luminance comprise mean luminance values from downsampled frames attained by the image sensor.

In one or more twenty-first embodiments, at least one machine readable medium comprises a plurality of instructions that, in response to being executed on an imaging device, cause the imaging device to provide auto iris control by implementing a first aperture control value to adjust an aperture opening of the imaging device, measuring a rate of change in measured luminance at an image sensor of the imaging device in response to implementing the first aperture control value, and determining an aperture control hold value based on the first aperture control value and the rate of change in measured luminance, such that the aperture control hold value is to hold the aperture opening at a current opening size.

In one or more twenty-second embodiments, further to the twenty-first embodiments, the first aperture control value is to close the aperture opening and the machine readable medium comprises further instructions that, in response to being executed on the imaging device, cause the imaging device to provide auto iris control by implementing a second aperture control value to adjust the aperture opening of the imaging device, such that the second aperture control value is to open the aperture opening and measuring a second rate of change in measured luminance at the image sensor in response to implementing the second aperture control value, such that determining the aperture control hold value comprises an interpolation of the first aperture control value, the rate of change in measured luminance, the second aperture control value, and the second rate of change in measured luminance to determine the aperture control hold value at or near a zero rate of change in luminance.

In one or more twenty-third embodiments, further to the twenty-first or twenty-second embodiments, the machine readable medium comprises further instructions that, in response to being executed on the imaging device, cause the imaging device to provide auto iris control by implementing a second aperture control value to adjust the aperture opening of the imaging device, determining an expected rate of change in luminance based on the second aperture control value, measuring a second rate of change in measured luminance at the image sensor in response to implementing the second aperture control value, and determining, when the expected rate of change in luminance is within a threshold of the second rate of change in measured luminance, a second aperture control hold value based on the second aperture control value and the second rate of change in measured luminance or discarding, when the expected rate of change in luminance is not within the threshold of the second rate of change in measured luminance, the second rate of change in measured luminance.

In one or more twenty-fourth embodiments, further to the twenty-first through twenty-third embodiments, the machine readable medium comprises further instructions that, in response to being executed on the imaging device, cause the imaging device to provide auto iris control by implementing a second aperture control value to adjust the aperture opening of the imaging device, determining an expected rate of change in luminance based on the second aperture control value, measuring a second rate of change in measured luminance at the image sensor in response to implementing the second aperture control value, and increasing, when the expected rate of change in luminance is within a threshold of the second rate of change in measured luminance, a confidence level corresponding to the second aperture control value or decreasing, when the expected rate of change in luminance is not within the threshold of the second rate of change in measured luminance, the confidence level corresponding to the second aperture control value.

In one or more twenty-fifth embodiments, further to the twenty-first through twenty-fourth embodiments, the machine readable medium comprises further instructions that, in response to being executed on the imaging device, cause the imaging device to provide auto iris control by implementing, when the expected rate of change in luminance is within the threshold of the second rate of change in measured luminance and subsequent to said increasing the confidence level, the second aperture control value to adjust the aperture opening of the imaging device, measuring a third rate of change in measured luminance at the image sensor in response to implementing the second aperture control value, and updating one of the aperture control hold value, an aperture maximum close control value, or an aperture maximum open control value based on a weighted average of the second rate of change and the third rate of change.

In one or more twenty-sixth embodiments, further to the twenty-first through twenty-fifth embodiments, the machine readable medium comprises further instructions that, in response to being executed on the imaging device, cause the imaging device to provide auto iris control by implementing a second aperture control value to adjust the aperture opening to attain a target luminance by determining a target luminance trajectory to the target luminance, determining, for a next time instance, a difference between a projected luminance based on a current aperture control value and a next time instance target luminance along the target luminance trajectory, and selecting the second aperture control value by adjusting the current aperture control value based on the difference.

In one or more twenty-seventh embodiments, further to the twenty-first through twenty-sixth embodiments, the target luminance trajectory comprises a smooth non-linear target luminance trajectory, such that the projected luminance comprises a linear extrapolation from a current measured luminance based on a previous measured luminance, and selecting the second aperture control value comprises multiplying the difference by a speed adjustment factor and adding the result to the current aperture control value.

In one or more twenty-eighth embodiments, a system comprises means for implementing a first aperture control value to adjust an aperture opening of the imaging device, means for measuring a rate of change in measured luminance in response to implementing the first aperture control value, and means for determining an aperture control hold value based on the first aperture control value and the rate of change in measured luminance, such that the aperture control hold value is to hold the aperture opening at a current opening size.

In one or more twenty-ninth embodiments, further to the twenty-eighth embodiments, the first aperture control value is to close the aperture opening and the system further comprises means for implementing a second aperture control value to adjust the aperture opening of the imaging device, such that the second aperture control value is to open the aperture opening and means for measuring a second rate of change in measured luminance in response to implementing the second aperture control value, such that the means for determining the aperture control hold value comprise means for performing an interpolation of the first aperture control value, the rate of change in measured luminance, the second aperture control value, and the second rate of change in measured luminance to determine the aperture control hold value at or near a zero rate of change in luminance.

In one or more thirtieth embodiments, further to the twenty-eighth or twenty-ninth embodiments, the system further comprises means for implementing a second aperture control value to adjust the aperture opening of the imaging device, means for determining an expected rate of change in luminance based on the second aperture control value, means for measuring a second rate of change in measured luminance in response to implementing the second aperture control value, and means for determining, when the expected rate of change in luminance is within a threshold of the second rate of change in measured luminance, a second aperture control hold value based on the second aperture control value and the second rate of change in measured luminance or means for discarding, when the expected rate of change in luminance is not within the threshold of the second rate of change in measured luminance, the second rate of change in measured luminance.

In one or more thirty-first embodiments, further to the twenty-eighth through thirtieth embodiments, the system further comprises means for implementing a second aperture control value to adjust the aperture opening of the imaging device, means for determining an expected rate of change in luminance based on the second aperture control value, means for measuring a second rate of change in measured luminance in response to implementing the second aperture control value, and means for increasing, when the expected rate of change in luminance is within a threshold of the second rate of change in measured luminance, a confidence level corresponding to the second aperture control value or means for decreasing, when the expected rate of change in luminance is not within the threshold of the second rate of change in measured luminance, the confidence level corresponding to the second aperture control value.

In one or more thirty-second embodiments, further to the twenty-eighth through thirty-first embodiments, the system further comprises means for implementing a second aperture control value to adjust the aperture opening to attain a target luminance, the means for implementing the second aperture control value comprising means for implementing a second aperture control value determining a target luminance trajectory to the target luminance, means for implementing a second aperture control value determining, for a next time instance, a difference between a projected luminance based on a current aperture control value and a next time instance target luminance along the target luminance trajectory, and means for implementing a second aperture control value selecting the second aperture control value by adjusting the current aperture control value based on the difference.

In one or more thirty-third embodiments, at least one machine readable medium may include a plurality of instructions that in response to being executed on a computing device, causes the computing device to perform a method according to any one of the above embodiments.

In one or more thirty-fourth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An imaging device comprising:
   a motor to adjust a size of an aperture opening adjacent to a lens;
   an image sensor adjacent to the lens; and
   a controller coupled to the motor, the controller to provide a first aperture control value to control the motor to close the aperture opening, to determine a first rate of change in measured luminance at the image sensor in response to implementation of the first aperture control value, to provide a second aperture control value to control the motor to open the aperture opening, to determine a second rate of change in measured luminance at the image sensor in response to implementation of the second aperture control value, and to perform an interpolation of the first aperture control value, the second aperture control value, the first rate of change in measured luminance, and the second rate of change in measured luminance to determine an aperture control hold value at or near a zero rate of change in luminance, wherein the aperture control hold value is to hold the aperture opening at a current opening size.

2. The imaging device of claim 1, wherein the controller is further to provide a third aperture control value to control the motor to adjust the aperture opening, to determine an expected direction of change in luminance based on the third aperture control value, to determine a third rate of change in measured luminance at the image sensor in response to implementation of the third aperture control value, and to determine, when the expected direction of change in luminance matches a direction of the third rate of change in measured luminance, a second aperture control hold value based on the third aperture control value and the third rate of change in measured luminance or to discard, when the expected direction of change in luminance does not match the direction of the third rate of change in measured luminance, the third rate of change in measured luminance.

3. The imaging device of claim 1, wherein the controller is further to provide a third aperture control value to control the motor to adjust the aperture opening, to determine an expected rate of change in luminance based on the third aperture control value, to determine a third rate of change in measured luminance at the image sensor in response to implementation of the third aperture control value, and to determine, when the expected rate of change in luminance is within a threshold of the third rate of change in measured luminance, a second aperture control hold value based on the third aperture control value and the third rate of change in measured luminance or to discard, when the expected rate of change in luminance is not within the threshold of the third rate of change in measured luminance, the third rate of change in measured luminance.

4. The imaging device of claim 1, wherein the controller is further to provide a third aperture control value to control the motor to adjust the aperture opening, to determine an expected rate of change in luminance based on the third aperture control value, to determine a third rate of change in measured luminance at the image sensor in response to implementation of the third aperture control value, and to increase, when the expected rate of change in luminance is within a threshold of the third rate of change in measured luminance, a confidence level corresponding to the third aperture control value or decrease, when the expected rate of change in luminance is not within the threshold of the third rate of change in measured luminance, the confidence level corresponding to the third aperture control value.

5. The imaging device of claim 4, wherein the controller is further to provide, when the expected rate of change in luminance is within the threshold of the third rate of change in measured luminance and subsequent to said increase of the confidence level, the third aperture control value to control the motor to adjust the aperture opening, to determine a fourth rate of change in measured luminance at the image sensor in response to implementation of the third aperture control value, and to update one of the aperture control hold value, an aperture maximum close control value, or an aperture maximum open control value based on a weighted average of the third rate of change and the fourth rate of change.

6. The imaging device of claim 1, wherein the controller is further to provide an aperture maximum close control value to control the motor to close the aperture opening of the imaging device, to determine a third rate of change in measured luminance at the image sensor in response to implementation of the aperture maximum close control value, and to, when the third rate of change in measured luminance indicates no change or an increase in measured luminance, adjust the aperture maximum close control value, wherein the aperture maximum close control value is to close the aperture opening at a predetermined maximum close speed.

7. The imaging device of claim 1, wherein the controller is further to implement a third aperture control value to control the motor to adjust the aperture opening to attain a target luminance, wherein the controller to implement the third aperture control value comprises the controller to determine a target luminance trajectory to the target luminance, to determine, for a next time instance, a difference between a projected luminance based on a current aperture control value and a next time instance target luminance along the target luminance trajectory, and to select the third aperture control value by an adjustment of the current aperture control value based on the difference.

8. The imaging device of claim 7, wherein the target luminance trajectory comprises a smooth non-linear target luminance trajectory, wherein the projected luminance comprises a linear extrapolation from a current measured luminance based on a previous measured luminance, and the controller to select the third aperture control value comprises the controller to multiply the difference by a speed adjustment factor and add the result to the current aperture control value.

9. The imaging device of claim 1, wherein the first rate of change in measured luminance comprises a difference between a first measured frame luminance and a second measured frame luminance subsequent to the first measured frame luminance over time, and wherein the first measured frame luminance and the second measured frame luminance comprise mean luminance values from downsampled frames attained by the image sensor.

10. A method for providing auto iris control for an imaging device comprising:
implementing a first aperture control value to close an aperture opening of the imaging device;
measuring a rate of change in measured luminance at an image sensor of the imaging device in response to implementing the first aperture control value;
implementing a second aperture control value to open the aperture opening of the imaging device;
measuring a second rate of change in measured luminance at the image sensor in response to implementing the second aperture control value; and
determining an aperture control hold value based on an interpolation of the first aperture control value, the second aperture control value, the first rate of change in measured luminance, and the second rate of change in measured luminance to determine the aperture control hold value at or near a zero rate of change in luminance, wherein the aperture control hold value is to hold the aperture opening at a current opening size.

11. The method of claim 10, further comprising
implementing a third aperture control value to adjust the aperture opening of the imaging device;
determining an expected rate of change in luminance based on the third aperture control value;
measuring a third rate of change in measured luminance at the image sensor in response to implementing the third aperture control value; and
determining, when the expected rate of change in luminance is within a threshold of the third rate of change in measured luminance, a second aperture control hold value based on the third aperture control value and the third rate of change in measured luminance; or
discarding, when the expected rate of change in luminance is not within the threshold of the third rate of change in measured luminance, the third rate of change in measured luminance.

12. The method of claim 10, further comprising:
implementing a third aperture control value to adjust the aperture opening of the imaging device;
determining an expected rate of change in luminance based on the third aperture control value;
measuring a third rate of change in measured luminance at the image sensor in response to implementing the third aperture control value; and
increasing, when the expected rate of change in luminance is within a threshold of the third rate of change in measured luminance, a confidence level corresponding to the third aperture control value; or
decreasing, when the expected rate of change in luminance is not within the threshold of the third rate of change in measured luminance, the confidence level corresponding to the third aperture control value.

13. The method of claim 12, further comprising:
implementing, when the expected rate of change in luminance is within the threshold of the third rate of change in measured luminance and subsequent to said increasing the confidence level, the third aperture control value to adjust the aperture opening of the imaging device;
measuring a fourth rate of change in measured luminance at the image sensor in response to implementing the third aperture control value; and
updating one of the aperture control hold value, an aperture maximum close control value, or an aperture maximum open control value based on a weighted average of the third rate of change and the fourth rate of change.

14. The method of claim 10, further comprising:
implementing a third aperture control value to adjust the aperture opening to attain a target luminance by:
determining a target luminance trajectory to the target luminance;
determining, for a next time instance, a difference between a projected luminance based on a current aperture control value and a next time instance target luminance along the target luminance trajectory; and selecting the third aperture control value by adjusting the current aperture control value based on the difference.

15. The method of claim 14, wherein the target luminance trajectory comprises a smooth non-linear target luminance trajectory, wherein the projected luminance comprises a linear extrapolation from a current measured luminance based on a previous measured luminance, and selecting the third aperture control value comprises multiplying the difference by a speed adjustment factor and adding the result to the current aperture control value.

16. At least one non-transitory machine readable medium comprising a plurality of instructions that, in response to being executed on an imaging device, cause the imaging device to provide auto iris control by:

implementing a first aperture control value to close an aperture opening of the imaging device;

measuring a rate of change in measured luminance at an image sensor of the imaging device in response to implementing the first aperture control value;

implementing a second aperture control value to open the aperture opening of the imaging device;

measuring a second rate of change in measured luminance at the image sensor in response to implementing the second aperture control value; and determining an aperture control hold value based on an interpolation of the first aperture control value, the second aperture control value, the first rate of change in measured luminance, and the second rate of change in measured luminance to determine the aperture control hold value at or near a zero rate of change in luminance, wherein the aperture control hold value is to hold the aperture opening at a current opening size.

17. The at least one non-transitory machine readable medium of claim 16, the machine readable medium comprising further instructions that, in response to being executed on the imaging device, cause the imaging device to provide auto iris control by:

implementing a third aperture control value to adjust the aperture opening of the imaging device;

determining an expected rate of change in luminance based on the third aperture control value;

measuring a third rate of change in measured luminance at the image sensor in response to implementing the third aperture control value; and determining, when the expected rate of change in luminance is within a threshold of the third rate of change in measured luminance, a second aperture control hold value based on the third aperture control value and the third rate of change in measured luminance; or discarding, when the expected rate of change in luminance is not within the threshold of the third rate of change in measured luminance, the third rate of change in measured luminance.

18. The at least one non-transitory machine readable medium of claim 16, the machine readable medium comprising further instructions that, in response to being executed on the imaging device, cause the imaging device to provide auto iris control by:

implementing a third aperture control value to adjust the aperture opening of the imaging device;

determining an expected rate of change in luminance based on the third aperture control value;

measuring a third rate of change in measured luminance at the image sensor in response to implementing the third aperture control value; and increasing, when the expected rate of change in luminance is within a threshold of the third rate of change in measured luminance, a confidence level corresponding to the third aperture control value; or decreasing, when the expected rate of change in luminance is not within the threshold of the third rate of change in measured luminance, the confidence level corresponding to the third aperture control value.

19. The at least one non-transitory machine readable medium of claim 18, the machine readable medium comprising further instructions that, in response to being executed on the imaging device, cause the imaging device to provide auto iris control by:

implementing, when the expected rate of change in luminance is within the threshold of the third rate of change in measured luminance and subsequent to said increasing the confidence level, the third aperture control value to adjust the aperture opening of the imaging device;

measuring a fourth rate of change in measured luminance at the image sensor in response to implementing the third aperture control value; and updating one of the aperture control hold value, an aperture maximum close control value, or an aperture maximum open control value based on a weighted average of the third rate of change and the fourth rate of change.

20. The at least one non-transitory machine readable medium of claim 16, the machine readable medium comprising further instructions that, in response to being executed on the imaging device, cause the imaging device to provide auto iris control by:

implementing a third aperture control value to adjust the aperture opening to attain a target luminance by:

determining a target luminance trajectory to the target luminance;

determining, for a next time instance, a difference between a projected luminance based on a current aperture control value and a next time instance target luminance along the target luminance trajectory; and selecting the third aperture control value by adjusting the current aperture control value based on the difference.

21. The at least one non-transitory machine readable medium of claim 20, wherein the target luminance trajectory comprises a smooth non-linear target luminance trajectory, wherein the projected luminance comprises a linear extrapolation from a current measured luminance based on a previous measured luminance, and selecting the third aperture control value comprises multiplying the difference by a speed adjustment factor and adding the result to the current aperture control value.

* * * * *